US012367869B2

(12) United States Patent
Kalns et al.

(10) Patent No.: US 12,367,869 B2
(45) Date of Patent: Jul. 22, 2025

(54) CONVERSATIONAL ASSISTANT FOR CONVERSATIONAL ENGAGEMENT

(71) Applicant: SRI International, Menlo Park, CA (US)

(72) Inventors: Edgar T. Kalns, San Jose, CA (US); Dimitra Vergyri, Sunnyvale, CA (US); Girish Acharya, Redwood City, CA (US); Andreas Kathol, El Cerrito, CA (US); Leonor Almada, Santa Clara, CA (US); Hyong-Gyun Kim, Santa Clara, CA (US); Nikoletta Basiou, Sunnyvale, CA (US); Michael Wessel, Palo Alto, CA (US); Aaron Spaulding, Menlo Park, CA (US); Roland Heusser, Daly City, CA (US); James F. Carpenter, Mountain View, CA (US); Min Yin, San Jose, CA (US)

(73) Assignee: SRI International, Menlo Park, CA (US)

( * ) Notice: Subject to any disclaimer, the term of this patent is extended or adjusted under 35 U.S.C. 154(b) by 497 days.

(21) Appl. No.: 17/613,373

(22) PCT Filed: Jun. 15, 2020

(86) PCT No.: PCT/US2020/037768
§ 371 (c)(1),
(2) Date: Nov. 22, 2021

(87) PCT Pub. No.: WO2021/011139
PCT Pub. Date: Jan. 21, 2021

(65) Prior Publication Data
US 2022/0310079 A1    Sep. 29, 2022

Related U.S. Application Data

(60) Provisional application No. 62/875,671, filed on Jul. 18, 2019.

(51) Int. Cl.
*G10L 15/18* (2013.01)
*G06F 40/35* (2020.01)
(Continued)

(52) U.S. Cl.
CPC .......... *G10L 15/1815* (2013.01); *G06F 40/35* (2020.01); *G10L 13/02* (2013.01);
(Continued)

(58) Field of Classification Search
CPC ..... G10L 15/1815; G10L 13/02; G10L 15/22; G10L 25/63; G10L 25/66; G10L 13/00; G10L 15/26; G06F 40/35; G06F 3/167
See application file for complete search history.

(56) References Cited

U.S. PATENT DOCUMENTS 6,731,307 B1    5/2004  Strubbe et al.
9,756,185 B1*   9/2017  Madden, Jr. ...... H04M 3/42221
(Continued)

FOREIGN PATENT DOCUMENTS

JP    2017125921 A  *  7/2017

OTHER PUBLICATIONS

International Search Report and Written Opinion, PCT/US2020/037768, ISA:US, Sep. 2, 2020, 16 pp.

*Primary Examiner* — Daniel C Washburn
*Assistant Examiner* — Paul J. Mueller
(74) *Attorney, Agent, or Firm* — Rutan and Tucker, LLP

(57) ABSTRACT

A conversational assistant for conversational engagement platform can contain various modules including a user-model augmentation module, a dialogue management module, and a user-state analysis input/output module. The dialogue management module receives metrics tied to a user from the other modules to understand a current topic and a user's emotions regarding the current topic from the user-state analysis input/output module and then adapts dialogue (Continued)

from the dialogue management module to the user based on dialogue rules factoring in these different metrics. The dialogue rules also factors in both i) a duration of a conversational engagement with the user and ii) an attempt to maintain a positive experience for the user with the conversational engagement. A flexible ontology relationship representation about the user is built and stores learned metrics about the user over time with each conversational engagement, and then in combination with the dialogue rules, drives the conversations with the user.

20 Claims, 19 Drawing Sheets

(51) Int. Cl.
  *G10L 13/02* (2013.01)
  *G10L 15/22* (2006.01)
  *G10L 25/63* (2013.01)
  *G10L 25/66* (2013.01)

(52) U.S. Cl.
  CPC .............. *G10L 15/22* (2013.01); *G10L 25/63* (2013.01); *G10L 25/66* (2013.01)

(56) References Cited

U.S. PATENT DOCUMENTS

| | | | |
|---|---|---|---|
| 10,553,209 B2* | 2/2020 | Gruber | G10L 15/22 |
| 10,679,011 B2* | 6/2020 | Galitsky | G06F 40/30 |
| 10,810,110 B1* | 10/2020 | Thomas | G06F 11/3664 |
| 2002/0010000 A1* | 1/2002 | Chern | H04L 69/329 |
| | | | 455/414.3 |
| 2002/0194002 A1 | 12/2002 | Petrushin | |
| 2006/0122834 A1* | 6/2006 | Bennett | G10L 15/1822 |
| | | | 704/E15.047 |
| 2007/0003032 A1 | 1/2007 | Batni et al. | |
| 2009/0083203 A1* | 3/2009 | Cho | G06F 15/16 |
| | | | 706/21 |
| 2011/0010637 A1* | 1/2011 | Schneider | G06Q 10/107 |
| | | | 715/752 |
| 2012/0265024 A1* | 10/2012 | Shrivastav | G16H 50/30 |
| | | | 600/300 |
| 2016/0246373 A1* | 8/2016 | Sakaguchi | G06F 3/016 |
| 2017/0069340 A1 | 3/2017 | Nowson et al. | |
| 2018/0054523 A1* | 2/2018 | Zhang | H04M 7/0045 |
| 2018/0316791 A1* | 11/2018 | Cai | G06N 3/006 |
| 2019/0327331 A1* | 10/2019 | Natarajan | G06F 16/3323 |
| 2020/0258507 A1* | 8/2020 | Fregly | G10L 15/1822 |
| 2020/0302020 A1* | 9/2020 | Abu Asba | G10L 15/1822 |
| 2020/0401466 A1* | 12/2020 | Frost | G10L 15/1822 |

* cited by examiner

```
                    ┌─Start─┐
                    └───┬───┘
```

| The conversational assistant for conversational engagement receives metrics tied to a user in a dialogue management module of the conversational assistant for conversational engagement to understand a current topic and a user's emotions regarding the current topic and then adapting dialogue from the dialogue management module to the user based on dialogue rules factoring in these different metrics. |
|---|
| 302 |

| The conversational assistant for conversational engagement extracts the metrics tied to the user through conversations with the user over multiple different periods of interaction. |
|---|
| 304 |

| The conversational assistant for conversational engagement pushes or pulls state data for a speech-to-text process from a text-to-speech component. The conversational assistant for conversational engagement exchanges information with i) an automatic speech recognition module to detect and comprehend the user's audio input as well as exchanges information with the text-to-speech component to generate audio responses and queries from the conversational assistant for conversational engagements. An entirety of a conversation of a current session is stored in a short term memory so that various modules of the conversational assistant for conversational engagements can analyze both i) a user's specific utterances in context to a current question and/or response and ii) the user's specific utterances in light of a context of the entirety of the conversation of the current session with the user 1) when deciding subsequent dialogues, 2) when deciding to change a current topic, and 3) when deciding how to continue the conversational engagement with the user. |
|---|
| 306 |

| The conversational assistant for conversational engagement adapts the conversational engagement with the user with the dialogue rules in order to factor both i) an attempt to extend a duration of a conversational engagement with the user and ii) an attempt to maintain a positive experience for the user with the conversational engagement. |
|---|
| 308 |

The conversational assistant for conversational engagement uses dialogue rules codified through a dialogue specification language to dynamically adapt between the conversational assistant for conversational engagement initiating i) a free-form casual conversation with the user and ii) a directed dialogue with the user on a specific topic, based on a current conversational context.

310

The dialogue specification language enables expressive context-aware modeling of conversational content for end users in a textual language. The dialogue rules and branching structures to decide whether to continue on a current topic and when to transition off that topic but continue the engagement conversation with another topic are codified in the dialogue specification language.

312

Once a given topic is selected to be discussed, then the dialogue management module is configured to use dialogue rules to review i) an entire current conversation on that topic, ii) stored information on one or more previous conversations on that topic, and iii) stored information from linked topic nodes, as weighted factors to guide what a next question and/or response in the dialog will be about; and then, utilize dialogue templates populated and derived from the above information to generate that dialogue. The conversational assistant for conversational engagement detects and keeps track of a topic ID, derived from hierarchical classifiers for topics and co-clustering of related topics, in order to correctly identify a set of topics that are discussed in a free-form conversation between the user and the conversational assistant for conversational engagement.

314

The dialogue rules and branching structures uses the user state analysis to adapt the topic of the conversation to 1) points in that topic the user is amenable to and/or 2) points in another topic that the user is positive to and steer the conversation away from points in topics that the user state indicates negativity currently toward.

The conversational assistant for conversational engagement maintains a flexible ontology relationship representation about the user that that builds and stores learned information about the user over time with each conversational engagement and then in combination with the dialogue rules drive the conversations with the user.

318

The conversational assistant for conversational engagement creates and maintains one or more nodes for each of these topics in the flexible ontology relationship representation as well as link relationships between two or more topics tailored specific to the user.

320

The conversational assistant for conversational engagement detects for and tracks, via storing in long term memory in the nodes, user-specific knowledge on two or more topics selected from a group consisting of 1) family and other people associated with this user, 2) concerns this user has expressed, 3) emotional state associated with this user, 4) auditorily-detectable health indicators associated with this user, and 3) interests associated with this user.

322

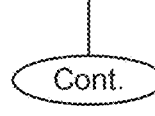

Fig. 3C

(Cont.)

Each node in the flexible ontology relationship representation associated with this user is associated with a particular topic and has a link to a storage location of learned facts and other information about the topic associated with that node. One or more of the topic nodes and the stored learned facts are referenced by the dialogue management module to populate questions and/or responses in the dialogue when the dialogue management module dialogues with the user.

324

The conversational assistant for conversational engagement monitors all dialogues with the user in order to monitor a current state of the user's health. The conversational assistant for conversational engagement references data stored on a prior history of the user's health condition through auditory assessment, including coughs, in a current or subsequent conversation session, when deciding when to change a current topic over to a topic on the user's health.

326

Fig. 3D 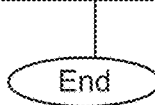 (End)

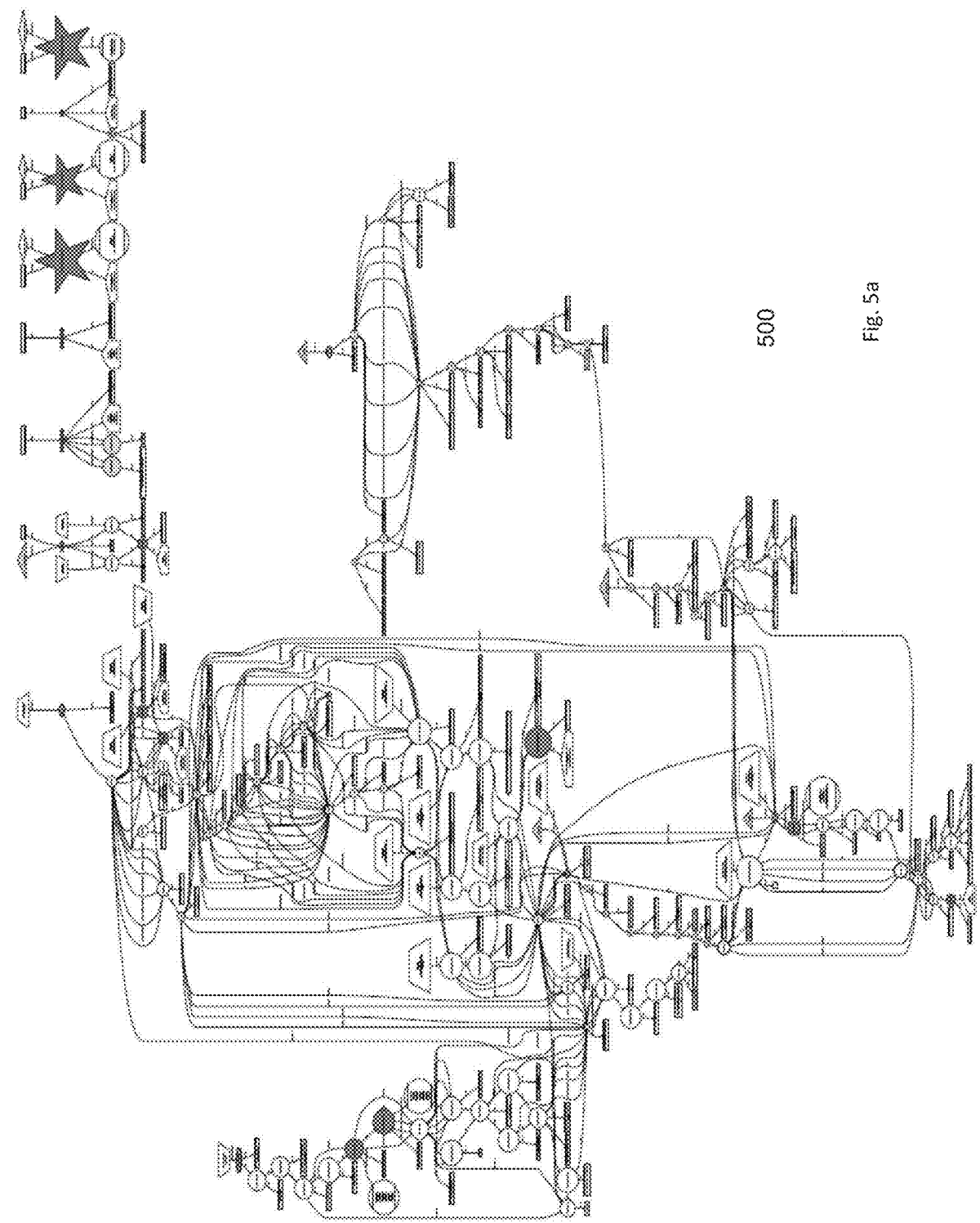

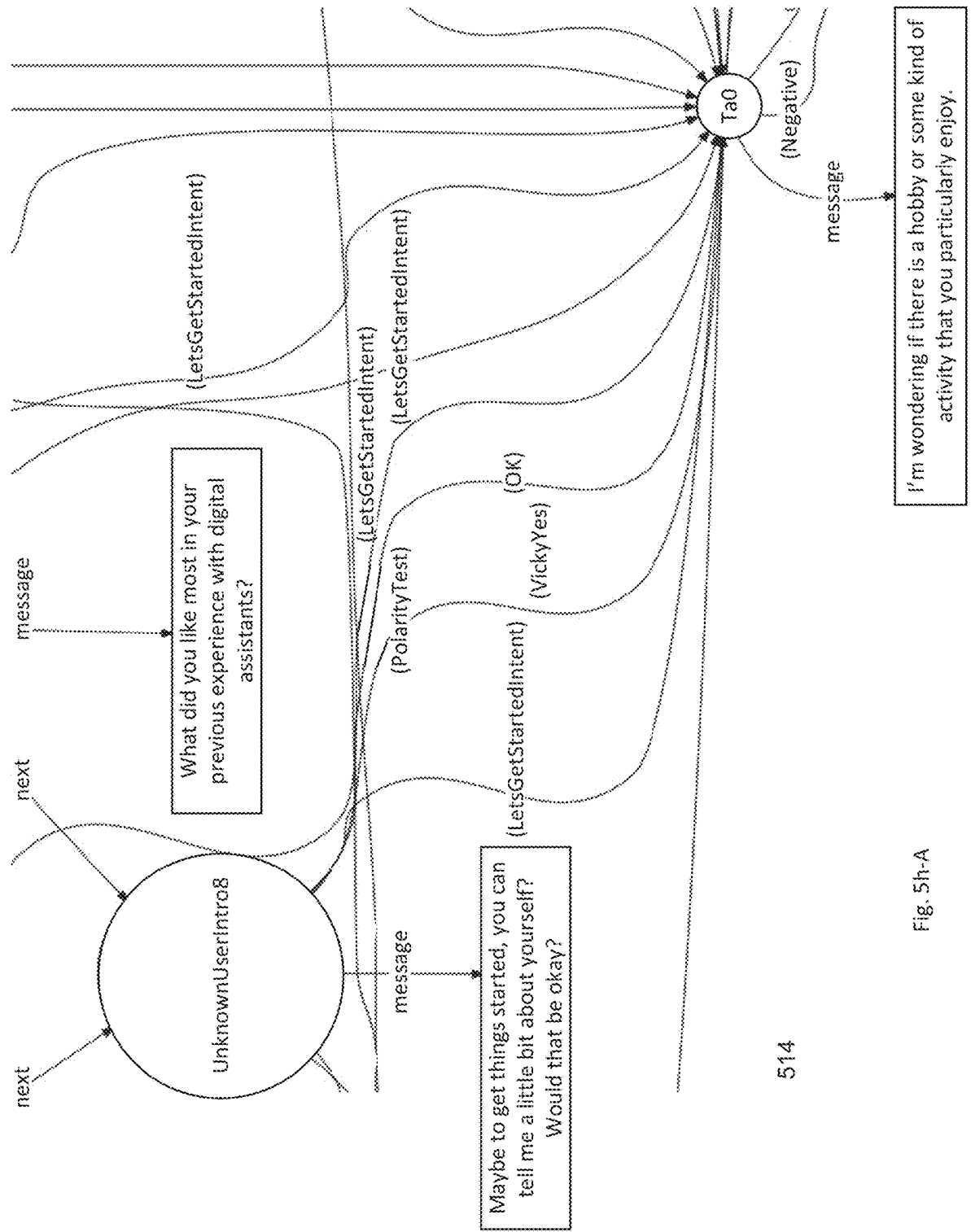
Fig. 5h-A

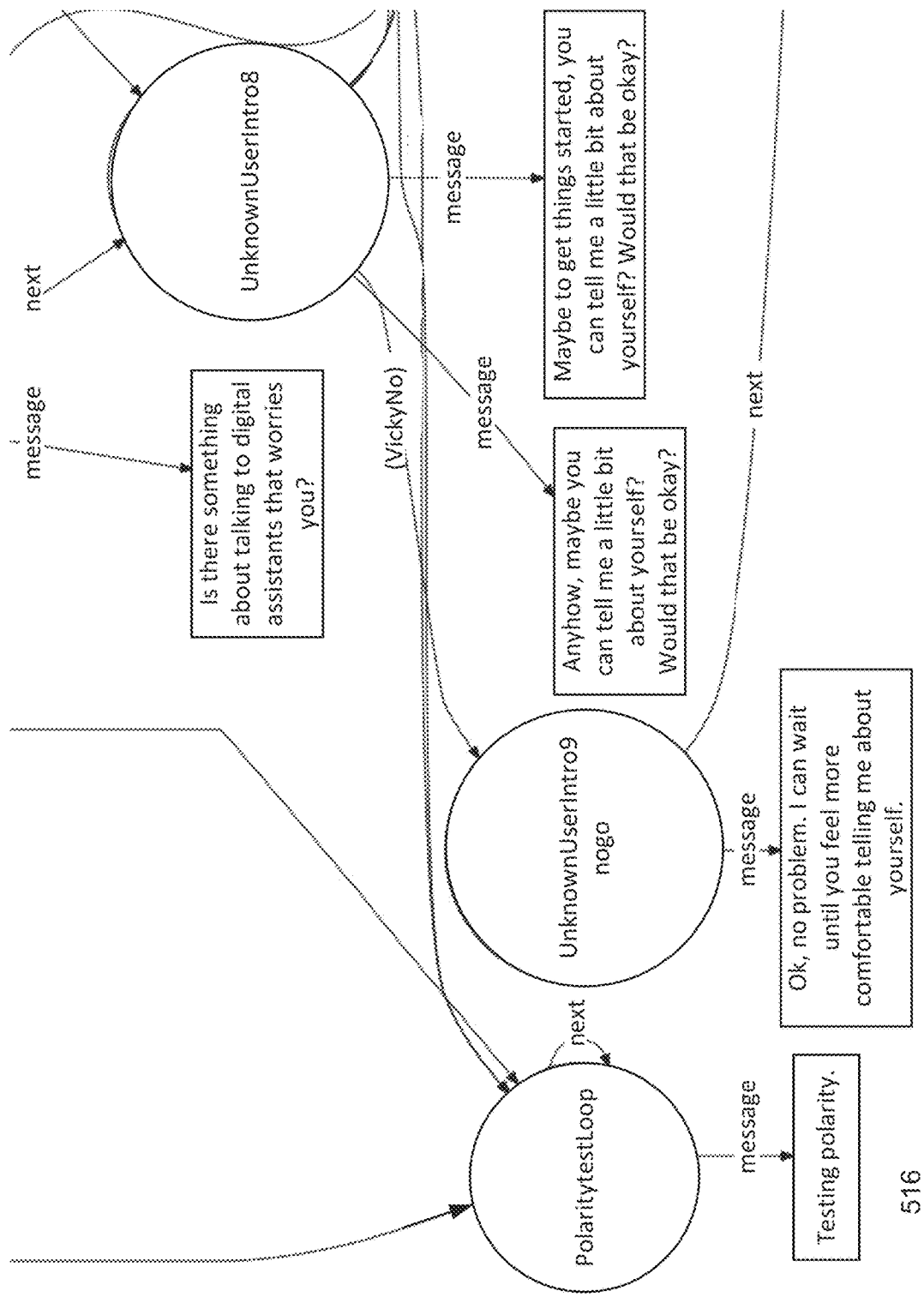
Fig. 5h-B

CONVERSATIONAL ASSISTANT FOR CONVERSATIONAL ENGAGEMENT

CROSS-REFERENCE

This application is a 35 U.S.C. $371 U.S. National Stage of International Patent Application No. PCT/US2020/037768, titled "THE CONVERSATIONAL ASSISTANT FOR CONVERSATIONAL ENGAGEMENT" having an International Filing Date of Jun. 15, 2020 which claims priority under 35 USC 119 to U.S. provisional patent application Ser. No. 62/875,671, titled "CHATPAL-A conversational assistant for unobtrusive health monitoring and social engagement," filed Jul. 18, 2019, the disclosure of which is incorporated herein by reference in its entirety.

TECHNICAL FIELD

Embodiments of this disclosure relate generally to artificial intelligence and virtual personal assistants.

BACKGROUND

Traditional Virtual Personal Assistants (VPAs) can be goal oriented VPAs that serve with directed dialogues and understand a limited possibilities of user intents. Current virtual personal assistants (VPAs), e.g. Alexa, are designed for limited, short interactions: Q&As, goal-directed queries & commands. They are not designed to well understand nor contribute to free-form dialogue interactions about general topics of human interest, e.g., family, friends, health concerns. They do not generally develop a "model" of the user. Accordingly, users do not view these VPAs as conversational partners. Note, a free-flowing conversation (as humans engage in) is a very rich source of information. One can learn about each other: interests, emotional state, health conditions through verbal cues. This information today is untapped, particularly for seniors where it is badly needed due to increasing a) social isolation and b) health issues. It must be systematically captured in a user model, built by a conversational interaction (small data challenge). There is an unmet need for developing a VPA that leverages reinforcement learning and best practices on engaging dialogue with seniors. At minimum, it provides caregivers valuable health insights, but it may also prove to be a system that seniors enjoy interacting with, addressing social isolation issues that are tied to numerous health maladies.

SUMMARY

Methods, apparatuses, and systems are discussed for a conversational assistant. In an embodiment, a conversational assistant for conversational engagement platform can be embodied in a conversational engagement microservice platform. The conversational engagement microservice platform contains various modules of at least i) a user-model augmentation module, ii) a dialogue management module, and iii) a user-state analysis input/output module. The dialogue management module receives metrics tied to a user from the other modules to understand a current topic and a user's emotions regarding the current topic from the user-state analysis input/output module and then adapts dialogue from the dialogue management module to the user based on dialogue rules factoring in these different metrics. The conversational engagement microservice platform containing the various modules uses the user-state analysis input/output module to extract the metrics tied to the user through conversations with the user over multiple different periods of interaction. The dialogue rules of the conversational engagement microservice platform containing the various modules also factor both i) a duration of a conversational engagement with the user and ii) an attempt to maintain a positive experience for the user with the conversational engagement. The dialogue management module cooperates with the user-model augmentation module to implement and maintain a flexible ontology relationship representation about the user that builds and stores learned metrics about the user over time with each conversational engagement and then in combination with the dialogue rules, drive the conversations in the conversational engagement with the user. Note, any portion of the conversational assistant for conversational engagement platform that is implemented in software, then the software can be stored on a non-transitory computer readable medium in an executable format to be executed by one or more processors.

BRIEF DESCRIPTION OF THE DRAWINGS

FIGS. 3A-3D illustrate a flow diagram of an embodiment of a conversational engagement microservice platform containing the various modules that are configured to factor both i) a duration of a conversational engagement with the user and ii) attempt to maintain a positive experience for the user with the conversational engagement, where the dialogue management module cooperates with the user-model augmentation module to implement and maintain a flexible ontology relationship representation about the user that builds and stores learned metrics about the user over time with each conversational engagement and then in combination with the dialogue rules, drive the conversations in the conversational engagement with the user.

FIG. 5a illustrates a diagram of an embodiment of an example workflow graph of an example ontology built for the conversational assistant for conversational engagement.

FIGS. 5b-5i illustrate graph portions each showing a subset of nodes and edges that occur in a top-down fashion.

Figure 1:
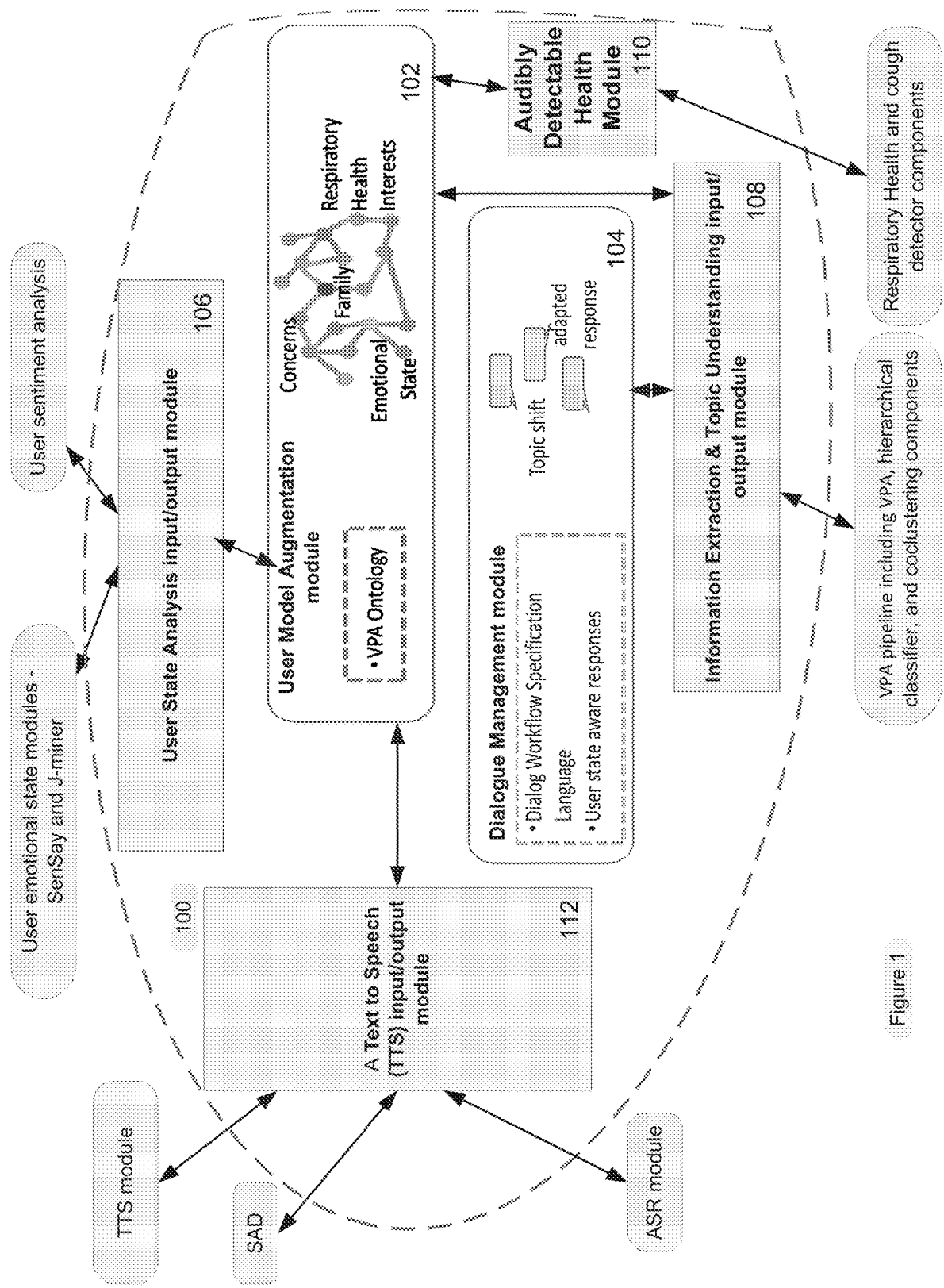
FIG. 1 illustrates a block diagram of an embodiment of a conversational engagement microservice platform containing a dialogue management module that receives metrics tied to a user from the other modules to understand a current topic and a user's emotions regarding the current topic from the user-state analysis input/output module and then adapt dialogue from the dialogue management module to the user based on dialogue rules factoring in these different metrics.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DETAILED DESCRIPTION

This disclosure describes inventive concepts with reference to specific examples. Thus, numerous specific details can be set forth, such as examples of specific data signals, named components, number of users, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as the first user, can be made. However, the specific numeric reference should not be interpreted as a literal sequential order but rather interpreted that the first user is different than a second user. The features implemented in one embodiment may be implemented in another embodiment where logically possible. Thus, the specific details set forth can be merely exemplary. The specific details can be varied from and still be contemplated to be within the spirit and scope of what is being disclosed.

In general, a conversational assistant for conversational engagement platform, such as ChatPal, can be implemented as a conversational engagement microservice platform with various modules. A dialogue management module receives metrics tied to a user from the other modules to understand a current topic and a user's emotions regarding the current topic from the user-state analysis input/output module and then adapts dialogue from the dialogue management module to the user based on dialogue rules factoring in these different metrics. The dialogue rules also factors in both i) a duration of a conversational engagement with the user and ii) an attempt to maintain a positive experience for the user with the conversational engagement. A flexible ontology relationship representation about the user is built and stores learned metrics about the user over time with each conversational engagement, and then in combination with the dialogue rules, drives the conversations with the user.

FIG. 1 illustrates a block diagram of an embodiment of a conversational engagement microservice platform containing a dialogue management module that receives metrics tied to a user from the other modules to understand a current topic and a user's emotions regarding the current topic from the user-state analysis input/output module and then adapts dialogue from the dialogue management module to the user based on dialogue rules factoring in these different metrics.

The conversational assistant for conversational engagement platform 100 can contain the various modules of a user-model augmentation module 102, a dialogue management module 104, a user-state analysis input/output module 106, an information-extraction and topic-understanding input/output module 108, an audibly detectable health input/output module 110, and other modules. In the conversational assistant for conversational engagement 100, the system dynamically adapts this Virtual Personal Assistant (VPA) between casual conversation and directed dialogue based on the conversational context.

The dialogue capability in the conversational assistant for conversational engagement 100 is enhanced via the dialogue rules to support almost human like dialogue that i) leverages multi-modal inputs, such as polarity and emotion, ii) builds details on the family and activities details in order to leverage them in subsequent dialogues, iii) decides when to change the topics, iv) etc. The multiple modules contained and cooperating within the container architecture of the conversational engagement microservice platform may function and cooperate as follows.

Text-to-Speech (TTS) Input/Output Module

The Text-to-Speech (TTS) input/output module 112 has i) one or more interfaces to state data for a speech-to-text process, ii) links to the state data for the speech-to-text process, and iii) any combination of both from a text-to-speech component. The links and/or interfaces exchange information with i) an automatic speech recognition (ASR) module to detect and comprehend the user's audio input as well as ii) the text-to-speech component to generate audio responses and queries from the conversational assistant for conversational engagement 100. The entirety of a current conversation of a current session is stored in a short term memory so that the various modules can analyze both i) a user's specific utterances in context to a current question and/or response and ii) the user's specific utterances in light of a context of the entirety of the conversation of the current session with the user 1) when deciding subsequent dialogues, 2) when deciding to change a current topic, 3) when deciding how to continue the conversational engagement with the user, 4) etc.

The TTS input/output module 112 creates links to the short-term memory storage for the current conversation in portions of the Text-to-Speech component, an Automatic Speech Recognition (ASR) module, and a Speech Activity Detector (SAD). The TTS input/output module 112 has one or more interfaces to state data for the speech activity and/or links to the state data for the speech activity from the speech activity detector. The TTS input/output module 112 can includes a first interface to cooperate with the speech activity detector, a second interface to cooperate with the Text-to-Speech component having a speaker & microphone, etc. The TTS input/output module 112 i) tracks and retrieves the speech audio data from a user and converts the information into in a useable format useable by the other modules of the conversational engagement microservice platform as well as ii) generates and/or returns responses in speech form through the Text-to-Speech component to the user from the 'conversational assistant for conversational engagement' microservice platform 100 in order to facilitate free-form dialogue interactions about general topics of human interest with the user.

User Model Augmentation module

The user-model augmentation module 102 detects for and tracks, via storing in long-term memory, user-specific knowledge on two or more topics including 1) family and other people associated with this user, 2) concerns this user has expressed, 3) emotional state associated with this user, 4) auditorily-detectable health indicators (e.g. cough and respiratory health problems) associated with this user, 5) interests associated with this user, and 6) other specific topics. The user-model augmentation module 102 creates and maintains one or more nodes for each of these topics in the flexible ontology relationship representation as well as links relationships between two or more topics tailored specific to the user. The user-model augmentation module 102 keeps a virtual personal assistant ontology representation of the relationships between these six categories of topics tailored specific to each current user. The user-model augmentation module 102 cooperates with the other modules to understand and contribute to free-form dialogue interactions about general topics of human interest, e.g., family, friends, health concerns. This information is systematically captured in a model trained on the user, built and continually trained on the user by conversational interaction with that user. The model trained on the user learns information about the likes, dislikes, associated people, and other information about this current user through conversation with the user, naturally, like people do with conversations. The free-flowing conversation is a very rich source of information. The user-model augmentation module 102 learns about the user's interests, emotional state, and health conditions through verbal cues. Again, this information is systematically captured in a user model, built through the conversational interaction with the user; and accordingly, each node in the flexible ontology relationship representation associated with this user is associated with a particular topic and has a link to a storage location of learned facts and other information about the topic associated with that node. The topic nodes and stored learned facts are referenced by the dialogue management module 104 to populate questions and/or responses in the dialogue when the dialogue management module 104 dialogues with the user. For example, when the dialogue management module 104 asks for updates about the previously discussed Topics, such as Family, Concerns, Emotional State, Respiratory Health, and Interests, then the dialogue management module 104 populates these questions with the context of previously known information about this Topic.

The dialogue management module 104 asks questions to find out more about the user directly through the speech information.

The conversational assistant also leverages reinforcement learning and best practices on engaging in dialogue with this user in its model.

The conversational assistant uses dialogue rules codified through a Dialogue Specification Language (DSL) (alternatively a decision tree and/or trained artificial intelligence model) to dynamically adapt between the conversational assistant for conversational engagement platform 100 initiating i) a free-form casual conversation with the user and ii) a directed dialogue with the user on a specific topic, based on a current conversational context. The conversational assistant leverages multi-modal inputs, such as emotion, a knowledge base of specific details on the user's family and friends as well as the user's activities and then leverages them in subsequent dialogues, deciding when to change the topics.

The dialog rules can be conditional rules or statements written to guide how and when to conduct the dialog including when to switch from, for example, a free form casual conversation over to directed dialog. The dialog rules" such as dialog guidelines, dialog directions, dialog regulations, dialog factors, etc. are factors that guide the resulting outcome 'from any of' and/or 'from all 3 of' a decision tree or ML or Reinforcement learning.

Dialogue Management module

The dialogue management module 104 receives metrics tied to a user from the other modules to understand a current topic and a user's emotions regarding the current topic from the user-state analysis input/output module 106 and then adapts dialogue from the dialogue management module 104 to the user based on the dialogue rules factoring in these different metrics. The conversational assistant's conversational content can be specified in the declarative, domain-specific dialogue specification language, which enables rapid and expressive context-aware modeling of conversational content for end users in a textual language. Examples of domain-specific languages can include HTML, Logo for pencil-like drawing, Verilog and VHDL hardware description languages, MATLAB and GNU Octave for matrix programming, Mathematica, Maple and Maxima for symbolic mathematics, Specification and Description Language for reactive and distributed systems, etc. The dialogue workflow specification, created from the domain-specific dialogue specification language, is then compiled into an ontology-based representation to be interpreted by a reflexive, ontology-based meta interpreter, specified in terms of higher-order logical rules, to implement the dialogue manager.

The dialogue management module 104 uses rules, codified through the dialogue specification language (or again alternatively implemented with a decision tree and/or trained artificial intelligence model), to detect for when a topic shift initiated by the user occurs, as well as, when the conversational assistant should try a topic shift, and then generates an adapted user-state aware response(s) based on the conversational context. The dialogue workflow in the dialogue specification language enables expressive context-aware modeling of conversational content for end users in a textual language. The dialogue rules and branching structures utilized to decide whether to continue on a current topic and when to transition off that topic but continue the engagement conversation with another topic are codified in the dialogue workflow specification language. The dialogue specification language is structured to enable a code size reduction from one or more previous dialogue workflow specifications; and thus, saves space on memory storage and power consumption to use this dialogue specification language. The dialogue management module 104 also uses rules and its branching structures codified through the dialogue specification language to decide whether to continue on a current topic and when to transition off that topic but continue the engagement conversation with another topic. The dialogue specification language also allows the specification of rules to choose "questions" to ease into a conversation and then followed by questions to recall one of the tracked topics or maintain the conversation on a current topic in a succinct, compact representation, for driving conversations about topics/threads. The dialogue management module 104 may reference a library of question structures that can be populated with stored content in the tracked topics associated with this user, or have standard responses to sympathize with, greet, or acknowledge points with the user. The dialogue management module 104 is coded to allow for the case where the user initiates the topic of the conversation and wants to learn about something and start a conversation that way. The dialogue management module 104 is coded to allow for the case where the conversational assistant initiates the topic of the conversation.

Once on a topic, the dialogue management module 104 uses the rules codified through the dialogue specification language to review both the entire current conversation and tracked knowledge from the topic nodes as weighted factors to guide what the next question will be about; and then, utilize question templates populated with the above information to generate its next question. The dialogue management module 104 uses weighted factors to guide "how" and "when" decisions are made to move forward with the conversation and on what topic. For example, the dialogue management module 104 and its specification of rules and its branching structures also leverage multi-modal inputs such as i) the user state (e.g. polarity and emotion) and ii) the stored content in the tracked topics associated with this user in subsequent dialogues, deciding when to change the topics, how to continue the engagement with the user, etc. The dialogue management module 104 and its specification of rules and branching structures also, in parallel, factors in unobstrusive monitoring of the user's health and stored prior history of the user's health condition, including coughs in subsequent dialogues, deciding when to change the topics, how to continue the engagement with the user, etc. The weighting within the rules and branching structures can use reinforcement learning to adjust the weighting of different topics and particular points within a topic. The dialogue management module 104 and its specification of rules use the user state analysis to adapt the topic of the conversation to points that the user is positive to and steer the conversation away from topics the user state indicates negativity currently toward that topic. The user-state analysis input/output module 106 cooperates with the dialogue management module 104 and its specification of dialogue rules in order to use the user state analysis to adapt the topic of the conversation to 1) points in that topic the user is amenable to and/or 2) points in another topic that the user is positive to and steer the conversation away from points in topics that the user state indicates negativity currently toward. The dialogue management module 104 tries to maintain a positive experience for the user with the conversational engagement by encouraging a willingness in the user to continue the conversational engagement. Once a given topic is selected to be discussed, then the dialogue management module 104 use the dialogue rules to review i) an entire current conversation on that topic, ii) stored information on one or more previous conversations on that topic, and iii) stored information from linked topic nodes, as weighted factors to guide what a next question and/or response in the dialogue will be about; and then, utilize dialogue templates populated and derived from the above information to generate that dialogue.

The conversational assistant for conversational engagement platform 100 learns via conversational interactions with the user. The conversational assistant for conversational engagement platform 100 builds rapport with the user just like in person-to-person communication. The conversational assistant for conversational engagement platform 100 starts with generic questions and as it gets to know more about the user, it starts asking about their early life story, marital status, etc. The conversational assistant for conversational engagement platform 100 learns about user, such as their hobbies and topics of interest by storing these details, and later asks for an update about the previously discussed hobbies and activities. The conversational assistant for conversational engagement platform 100 learns about social relationships such as spouse, children, grandchildren, friend, etc. by storing these details, and later asks about these as well. The conversational assistant for conversational engagement platform 100 leverages the learned information in follow up dialogues. For example, if the user was coughing last time, the conversational assistant for conversational engagement platform 100 remembers and asks about the person's help in a subsequent dialogue. The conversational assistant for conversational engagement platform 100 is codified to perform information extraction to assist in correctly identifying information tokens relevant to a conversation topic, e.g. time, place, names. The conversational assistant for conversational engagement platform 100 tries to approximate an equal conversational partner by letting a user control the topic of conversation rather than guiding to the constrained topics that the system knows. The conversational assistant for conversational engagement platform 100 actively solicits the user's feedback, e.g. asks whether it is okay to continue with the previous topic. The conversational assistant for conversational engagement platform 100 will stop the interaction at the customer's request. The conversational assistant for conversational engagement platform 100 leverages topic understanding (e.g. hiking) and user intent (e.g. likes to go with grandchildren) to detect the current and specific user interest. The conversational assistant for conversational engagement platform 100 gracefully switches to generic questions when the customer intent is not clear. The conversational assistant for conversational engagement platform 100 uses rules for topic understanding to correctly identify a set of topics that is currently being discussed in the free-from conversation.

The dialogue management module 104 cooperates with the user-model augmentation module 102 to implement and maintain a flexible ontology relationship representation about the user that builds and stores learned metrics about the user over time with each conversational engagement, and then in combination with the dialogue rules, drive the conversations in the conversational engagement with the user.

The workflow specification can be compiled into an ontology-based representation to be interpreted by a reflexive, ontology-based meta interpreter, specified in terms of higher-order logical rules, to be implement in the dialogue manager module. The dialogue management module 104 uses a flexible ontology- and rule-based dialogue management system for driving conversations.

Again, the dialogue management module 104 uses weighted factors to guide "how" and "when" decisions are made to move forward with the conversation and on what topic. The dialogue rules of conversational engagement microservice platform containing the various modules are also configured to factor both i) an attempt to maintain an extended duration of a conversational engagement with the user and ii) an attempt to maintain a positive experience for the user with the conversational engagement. The dialogue management module 104 tries to maintain a positive experience for the user with the conversational engagement by encouraging a willingness in the user to continue the conversational engagement. A positive experience can be measured, for example, by the user's words, or length of time that the user spends discussing a topic. In contrast, a user's negative comments and negative sentiment detected will cause the conversational assistant for conversational engagement to steer away from that topic and make note of the user's negativity. When a user sentiment is positively negative and/or is implicitly getting frustrated, then the dialogue rules indicate that the conversational assistant for conversational engagement platform 100 will switch topics entirely and/or at least switch to different points within a given topic in order to maintain the positive experience. The conversational assistant for conversational engagement platform 100 measures and collects system-wide metrics tied to the user, extracted through conversations with the user over multiple different periods of interaction, with a goal set to continue the conversational engagement as long as possible while trying to maintain a positive experience with the conversational engagement. The dialogue management module 104 generally receives an input from the information-extraction and topic-understanding input/output module 108 to keep on topic as well as exchange information when the user desires to transition to another topic. The dialogue management module 104 also may receive an input from the user-state analysis input/output module 106 on multi-modal inputs, such as sentiment and emotion. In addition, the dialogue management module 104 receives inputs from the other modules to understand context, emotions, and health, and then adapt its response(s) based on rules factoring in these different inputs. The dialogue management module 104 can analyze all of these inputs and detect and determine any negativity the user is conveying with their words, or attitude, or other input towards the current topic. Any negativity detected, the conversational assistant can ask the user if they still want to continue on this topic, or to transition to another topic or a different point within the topic. Note, the conversational assistant for conversational engagement platform 100 can interpret a user's emotion or sentiment as one of a triplet of possibilities (positive, neutral, negative) and then directs the ongoing dialogue context to adapt the system's response to the user. The conversational assistant also responds to various health conditions such as the user coughing to change the topic/conversation thread over to the detected health concern.

The dialogue management module 104's goal is to keep a user, such as a senior citizen, talking and engaged with the conversation—measured in factors, such as length and positive (non-negative) experience; in contrast to, a goal to end the conversation as soon as possible via a completion of a singular task or a singular transaction. Herein many examples of positive experiences have been given. The dialogue management module 104 will acknowledge a user's negative comments and sentiment on a given topic but will then try to steer the conversation over to other points within that topic and/or over to another topic that the user has previously had positive experiences with. Again, the dialogue management module 104 gets input on user state analysis and other factors to determine if the user is having a positive experience. The dialogue management module 104 is also configured with a goal of finding out more about the user directly through the speech information. The rules and its branching structure selects and generates the questions and responses in the conversation, based upon, this goal of continuing the positive engagement and finding out more about the user directly through the speech information collected and tracked from the conversations. The dialogue management module 104 dynamically adapts between casual conversation with the user and directed dialogue with the user based on the conversational context.

The dialogue management module 104 uses reusable, generic "dialogue policy model rules" on many issues including, for example, i) when to switch the topic; ii) how to ease into a conversation as well as; iii) how to follow up on past tracked topics for this user, which are tailored to this user, based on the ontology relationship representation (e.g. a graph of nodes) (see FIG. 4) and corresponding tracker history maintained for this currently user. As indicated in the user-model augmentation module 102, each node associated with having a relationship to the user in the ontology relationship representation is specific to a particular topic, e.g. particular entity, particular activity, particular hobby, etc. associated with that user. Each node 'assigned to a particular topic having a relationship to the user' has its own set of content, informational facts, etc. about that topic stored in long term memory. A topic, such as a grandson, may have many different individual points tracked within that topic. The dialogue manager uses the reusable, generic dialogue policy model rules to guide the conversation, which is drawn from and guided by stored content in the tracked topics associated with this user from previous dialogues/conversation sessions.

The textual dialogue specification language is end user-friendly, rapid to author, and based on an intuitive, easy to grasp graph-based dialogue workflow model. Conversational content is specified in the dialogue workflow graph, which consists of dialogues nodes for certain discussion topics, and of edges which model (conditional) transitions between nodes, based on multi-model input and context of the dialogue. They naturally model follow-up utterances of the system, based on the conversational input provided by the user, and the current dialogue state. A dialogue workflow specification codified in the dialogue specification language may be created with ten times code size reduction from some other previous dialogue workflow specifications; and thus, saves on memory storage and power consumption.

In an embodiment, a dialogue model may consist of hundreds of nodes and edges. Nodes can be triggered based on conditions, based on multi-modal inputs, dialogue state, and events. The dialogue workflow graph specified in the high-level, end user-friendly dialogue specification language can be compiled into an Ontology Web Language (OWL) representation, which is then interpreted by a set of OntoVPA rules, which act as an "interpreter" for the dialogue specification. The meta-circular DSL interpreter allows for sub-dialogues and interrupts in dialogues based on events or "trigger rules" (and dialogue resumes), and is able to exploit the long-term memory from the user-model augmentation module 102.

The conversational assistant for conversational engagement platform 100 leverages its understanding of each topic (e.g. a first node for a user's frequent activity such as hiking, a second node for the user's family that branches into individual nodes on family members, etc.) and detected current and previous user intent (e.g. likes to go hiking with grandchildren in which her grandchild Ken is another topic that has its own node populated with tracked information) on that topic in order to determine the current and specific user interest to pursue during a current conversation session.

The dialogue management module 104 also references the short-term memory containing the current conversation to ensure that it does not repeatedly ask the same question again in a conversation session.

User-State Analysis Input/Output Module

The conversational engagement microservice platform containing the various modules is configured to at least use the user-state analysis input/output module 106 to extract the metrics tied to the user through conversations with the user over multiple different periods of interaction. The user-state analysis input/output module 106 has one or more interfaces to and/or links to the state data from the user emotional state modules, such as SenSay and J-miner, a polarity detector, and user sentiment analysis. The user emotional state modules estimate speaker state, including emotion, sentiment, cognition, mental health and communication quality, in a range of end applications, and the interfaces from the user-state analysis input/output module 106 can pull or push the estimates and data from the user emotional state modules. The user-state analysis input/output module 106 tracks these inputs from the user emotional state modules, such as Sensay, J-miner, a polarity detector, and a combination of any of these and supplies these to the dialogue management module 104.

In an embodiment, SenSay detects and tracks the user's emotional state and/or sentiment, via analyzing their speech both acoustic & lexical, and outputs the user's emotion as a triplet of possibilities (positive, neutral, negative). The emotion detected can be, for example, happy/sad/neutral/angry. A happy sentiment and/or at least not an angry or sad sentiment can be a factor in maintaining a positive experience. Overall, the user-state analysis input/output module 106 interfaces with the various user emotional state modules to detect and keep track of sentiment analysis (attitude toward a situation or event) from the user to determine an intent regarding that topic.

The conversational assistant for conversational engagement platform 100 uses the user-state analysis input/output module 106 to understand i) emotions on the stored knowledge of on the topics in the nodes as well as their emotion on the current topic, and combines this with ii) an analysis of the entire conversation stored in short term memory, in order to accordingly adapt ongoing dialogue with the user. As discussed more further down, the conversational assistant for conversational engagement platform 100 also responds to various health conditions such as the user coughing. Combining these two knowledge sources, the conversational assistant for conversational engagement platform 100 can accurately identify specific health conditions and emotional states from the conversation.

Information Extraction & Topic Understanding

The information-extraction and topic-understanding input/output module 108 is configured to detect and keep track of a topic ID, derived from hierarchical classifiers for topics and co-clustering of related topics, in order to correctly identify a set of topics that are discussed in a free-form conversation between the user and the conversational assistant for conversational engagement platform 100. The topic understanding input/output module has an interface to work with the virtual personal assistant, hierarchical classifier, and co-clustering pipeline for identifying the topic and intent regarding a topic. The information-extraction and topic-understanding input/output module 108 can also have one or more links to the state data from the Virtual Personal Assistant (VPA) pipeline. The information-extraction and topic-understanding input/output module 108 track inputs from the VPA pipeline including a hierarchical classifier and a co-clustering portion of the pipeline for identifying the topic and supplies this to the dialogue management module 104.

The topic understanding input/output module detects and keeps track of topic ID in order to correctly identify the set of topics that are discussed in the free-from conversation (as opposed to a structured—menu tree type dialogue with the user). The topic understanding input/output module can store the TopicID. The hierarchical classifier and co-clustering pipeline leverages deep learning (e.g. CNNs) technologies including co-clustering and hierarchical classifiers, for identifying the topic.

The information extraction input/output module can also provide many functions beyond tracking the topic ID. The information extraction input/output module detects and keeps track of sentence segmentation putting output segments from the automatic speech recognition module into semantically coherent units, as well as receives generated transcriptions from the automatic speech recognition module.

Audibly Detectable Health Input/Output Module

The audibly detectable health module, such as respiratory health, has one or more interfaces to the state data for the respiratory health of the user, and/or links to the state data for the respiratory health of the user. The audibly detectable health input/output module 110 cooperates with the dialogue management module 104. The audibly detectable health input/output module 110 can i) monitor all dialogues with the user in order to monitor a current state of the user's health, and ii) reference data stored on a prior history of the user's health condition, including coughs, in a current or subsequent conversation session, when deciding when to change a current topic over to a topic on the user's health. Respiratory health, (e.g. cough, wheezing, sniffles, etc.) is a main audible cues that the system can pick up. The audibly detectable health input/output module 110 track inputs from a cough detector and/or a respiratory health detector and supplies this information to the dialogue management module 104.

The audibly detectable health input/output module 110 performs unobtrusive health monitoring by simply listening to the user's speech and other sounds coming from the user. The audibly detectable health input/output module 110 also tracks characteristics of past coughing episodes of the user including frequency of coughs, duration of coughs, amount of coughs, whether the coughs are wet coughs or dry coughs, etc. The audibly detectable health input/output module 110 can compare a current cough to past incidents to determine if the cough is getting worse and/or a need exists to transition the conversation from the current topic into questions about whether the user needs help or if they are okay.

Figure 2:
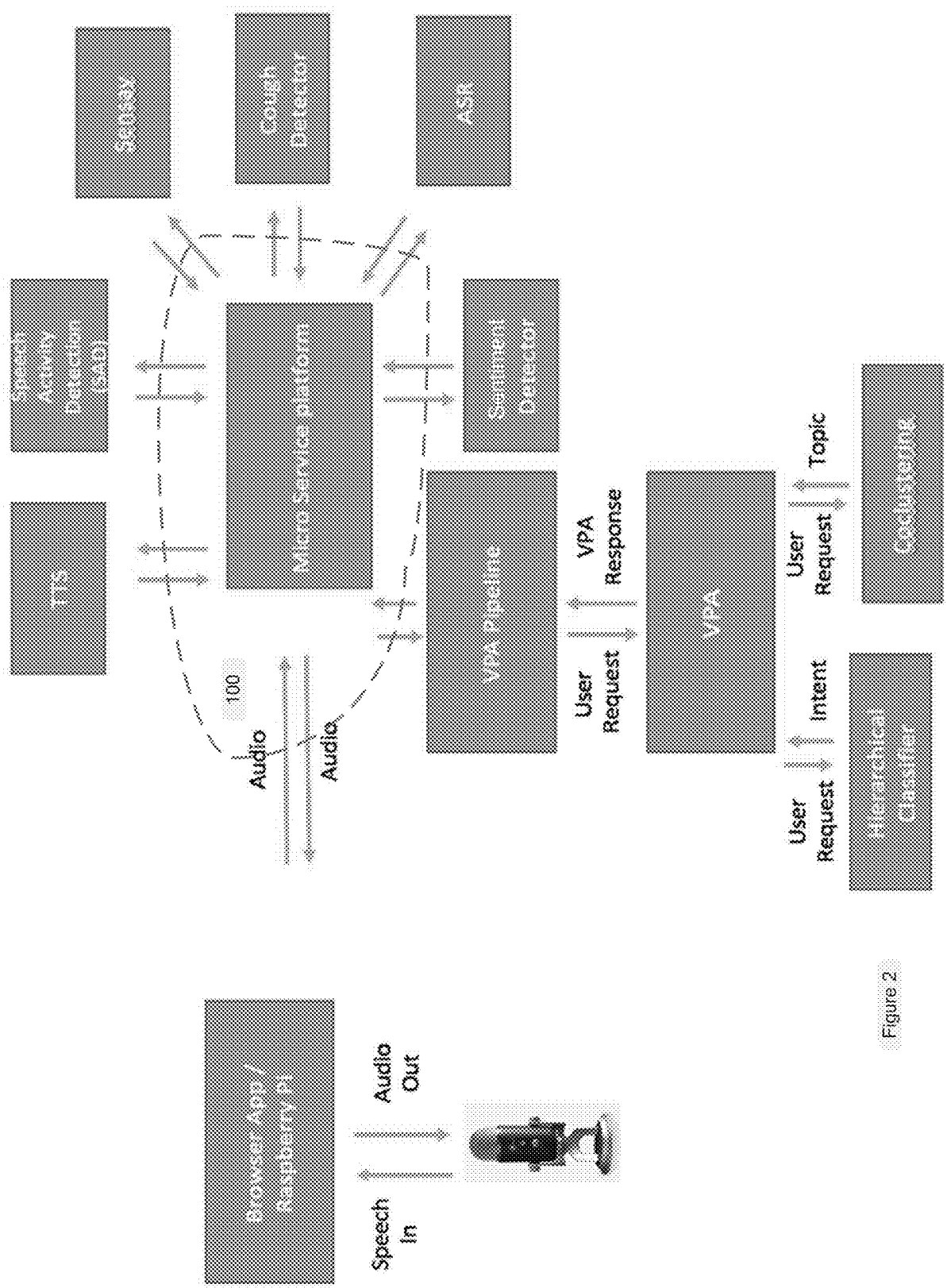
FIG. 2 illustrates a block diagram of an embodiment of a conversational engagement microservice platform containing the various modules configured to detect for and track user-specific knowledge on two or more topics as well as create and maintain one or more nodes for each of these topics in a flexible ontology relationship representation tailored specific to the user.

FIG. 2 illustrates a block diagram of an embodiment of a conversational engagement microservice platform containing the various modules configured to detect for and track user-specific knowledge on two or more topics as well as create and maintain one or more nodes for each of these topics in a flexible ontology relationship representation tailored specific to the user.

Dynamic Adaptation

The conversational assistant for conversational engagement platform 100 is a VPA that accomplishes dynamic adaptation by using multiple approaches.

Again, the dialogue management module uses weighted factors to guide "how" and "when" decisions are made to move forward with the conversation and on what topic. The dialogue management module handles higher priority intents and changing the topic of a conversation thread in many situations. For example, the dialogue management module changes the topic when the person is coughing for a long time or coughing is worsening, and switches from the casual conversation to directed questions on a cough-related information gathering mode to make sure the user is fine. The dialogue management module changes the topic when recognizing other negative health conditions are detected, and may relay this information to the health support staff. The dialogue management module changes the topic when a user's request for ending the conversation, user's request to change the topic, etc.

The dialogue management module determines the user's objective by classification, user's intent derived from speech, and co-clustering topics to support free flow dialogues. The dialogue management module can also attempt to determine an intended topic, when they come back with a higher confidence. The dialogue management module can also determine the topics that are a part of co-clustering. The dialogue management module can get the user's confirmation before changing the topic.

The dialogue management module can prioritize topics based on current user's context. The dialogue management module can filter out the topic candidates, which are not relevant to the current discussion context. For example, when the dialogue management module is discussing knitting, the topic comes back with knitting as the second or the third ranked topics, the dialogue management module will still stay on knitting. If knitting is very low in the rank based on the last few user comments, the dialogue management module will change the topic. Thus, the dialogue management module uses many weighted factors to guide "how" and "when" to move forward with the conversation and on what topic.

More on Dialogue

Figure 4:
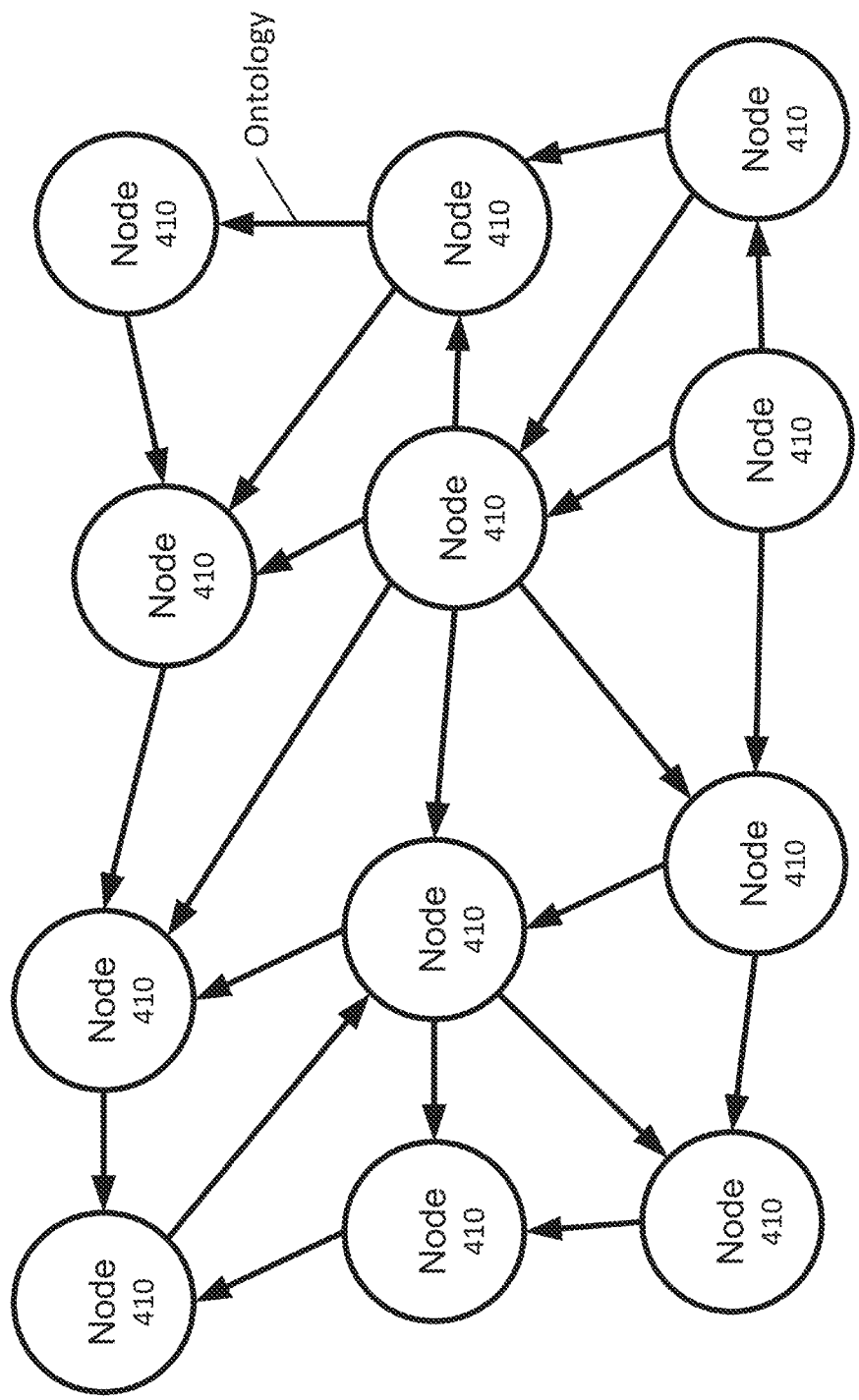
FIG. 4 illustrates a diagram of an embodiment of one or more nodes for each of the topics in the flexible ontology relationship representation as well as link relationships between two or more topics in the nodes tailored specific to the user.

FIG. 4 illustrates a diagram of an embodiment of one or more nodes for each of the topics in the flexible ontology relationship representation as well as link relationships between two or more topics in the nodes tailored specific to the user. Each node 410, corresponds to a particular topic known about that user, such as Ken the grandson, knitting, etc. and the linked relationship between each node for natural connections between them. The conversational assistant for conversational engagement platform 100 features a declarative, highly expressive and flexible ontology and rule-based dialogue management system for driving conversations. The conversational assistant for conversational engagement platform 100 can be based on the ontology-based dialogue management system OntoVPA. The ontology can generally be the exact description of things and the relationships to other things. The conversational assistant for conversational engagement platform 100 can use the Web Ontology Language (OWL) for ontology specification, and highly expressive SPARQL rules to implement the dialogue workflow specification. In an embodiment, the SPARQL rules can include a collection of RDF vocabularies such as the SPARQL Inferencing Notation (SPIN) that build on the W3C SPARQL standard. These vocabularies let a codifier to define new functions, stored procedures, constraint checking, and inferencing rules for the models. In contrast, to previous dialogue systems built on top of the OntoVPA DMS required hand-crafted SPARQL rules for policy implementation, which can be tedious and complicated to specify for non-experts, the conversational assistant for conversational engagement platform 100 employs a high-level, end user-friendly dialogue specification language. This is a domain specific dialogue specification language tailored for the specification of conversational content for conversational VPAs such as the conversational assistant for conversational engagement platform 100. The modeling in the text of the dialogue specification language is end user-friendly, rapid to author, and based on an intuitive, easy to grasp graph-based dialogue workflow model. Conversational content is specified in the dialogue workflow graph, which consists of dialogues nodes for certain discussion topics, and of edges which model (conditional) transitions between nodes, based on multi-model input and context of the dialogue. They naturally model follow-up utterances of the system, based on the conversational input provided by the user, and the current dialogue state. The dialogue state encompasses the long-term model about the user's interests and social relationships, and the complete history of the current dialogue.

Human type Casual Conversation

In an embodiment, at least following features are supported through codification in the dialogue specification language.

Different types of nodes including a general conversational starter node, which provides finer control on the dialogue flow;

Multi-model branching based polarity, emotion, user input, current state and events;

Control for staying on the topic or changing the topic;

Build up the knowledge about the user such as hobbies, family relationships and leverage them in the subsequent dialogue; and Starting with the casual conversation with easy entry questions such as weekend activities before asking the follow up questions to the following session;

The dialogue history can be represented as a dynamic OWL ontology as well, and SPARQL rules that are evaluated over the history to determine the system's response (turn), based on the current dialogue state. The dialogue state is holistic, in the sense that it encompasses the entire dialogue history, as well as knowledge items that have been learned and memorized by the conversational assistant for conversational engagement platform 100 in previous conversations. For example, the conversational assistant for conversational engagement platform 100 can learn about friends or relatives of the user, and is capable to converse about these.

The static ontology can define the vocabulary of the conversational domain (i.e., domain terms and concepts such as Friend, Spouse, Knitting and Hiking), but also a taxonomy of general terms (i.e., it knows that "Yes" is subsumed by Affirmative Concept, and so on).

The dynamic ontology captures all the turns of the current dialogue, and includes the long-term memory and user's profile information, partly learned from previous dialogues. For example, the following dialogue node with the node name "unknown_user_intro" illustrate simple branching based on the user's reply to a simple yes/no question. It corresponds to a simple yes/no question, and demonstrates dialogue branching based on the classification of the user's answer to the question (this is also called the "utterance-domain" of the answer):

```
(Topic - "Hello, I am the conversational assistant for conversational
    engagement - Is this a good time to have a chat?"
  unknown_user_intro
  (:no-polarity t)
  (:don't-allow-topic-change t)
  (:utterance-domain
    ("NoAnswer" unknown_user_intro_wait)
    ("YesAnswer" unknown_user_intro_get_name)))
```

In case an affirmative answer is given by the user (i.e., an answer that is subsumed by the ontology concept "YesAnswer"—this might include "Yes", "Of Course, "Sure", "Go ahead" and so on), then the dialogue proceeds to the successor dialogue node "unknown_user_intro_get_name", which will next ask about the user's name (otherwise, the conversational assistant for conversational engagement platform 100 branches to the "unknown_user_intro_wait" node until the user is ready):

```
(Topic - "Please tell me your first name."
  unknown_user_intro_get_name
    (:no-polarity t)
    (:don't-allow-topic-change t)
    (:extract-and-store
    ("FemaleName" "unknownUser" "userName")
    ("MaleName" "unknownUser" "userName")
    ("TheyName" "unknownUser" "userName")
  (:utterance-domain
    ("FemaleName" unknown_user_intro_continue)
    ("MaleName" unknown_user_intro_continue))
    ("TheyName" unknown_user_intro_continue))
    (:next unknown_user_intro_get_name)))
```

If this question is answered with an utterance that contains a female or male name (i.e., a term that is subsumed by the ontology concepts "FemaleName," "TheyName," or "MaleName"), then the name is extracted from the user's utterance and stored The conversational assistant for conversational engagement's long-term memory as value of the "userName" slot on the "unknown_user" profile individual in the ontology such that subsequent dialogue turns/topic nodes can refer to the learned name. The dialogue then proceeds to the next node, as specified based on the utterance domain notion, i.e., "unknown_user_intro_continue", or tries again to acquire and extract the user's name by branching to "unknown_user_intro_get_name" again (such a "try again" loop might also be aborted after a number of failed attempts).

The conversational assistant for conversational engagement's dialogue model may consist of hundreds of such nodes and edges. Nodes can be triggered based on conditions, based on multi-modal inputs, dialogue state, and events. For example, certain dialogue topics/nodes might be triggered whenever a certain discussion topic comes up, when the user coughed or sneezed (here, an audio event could trigger a specific handler), or when certain friends or relatives or the user are mentioned.

The dialogue workflow graph specified in the DSL is compiled into an OWL representation, which is then interpreted by a set of OntoVPA rules, which act as an "interpreter" for the dialogue specification. These rules are supplied with the system in the upper-level layers (e.g. Upper Level Ontology and Upper Level Rule Layers), and do not need to be specified by the developer. However, a developer is free to edit and change OntoVPA's meta level architecture simply by adding, removing, or modifying rules, resulting in a change of the conversational interpreter logic. This can be done in a declarative way, without requiring traditional programming.

The DSL allows rapid development of conversational content, in a declarative, end-user friendly way. Experienced developers may also choose to extent the DSL, if additional expressive means of functionalities should be needed (i.e., dialogue branching on new modalities, such as mood detected by a mood detector from speech, confusion, or any other multi-modal input).

The meta-circular DSL interpreter allows for sub-dialogues and interrupts in dialogues based on events or "trigger rules" (and dialogue resumes), and is able to exploit the long-term memory. For example, the interrupt/resume functionality enables dialogues such as the following:

The conversational assistant for conversational engagement: "Did you do anything fun since we last talked?"
User: "I went hiking with my friend Rita!"
The conversational assistant for conversational engagement: "Ah! Is this your friend Rita that you told me about last time?" [Interrupt]User: "Yes, that's her."
The conversational assistant for conversational engagement: "Great, I see! Let's continue—"
The conversational assistant for conversational engagement: "Where did you go hiking?"

Indentation indicates that the interrupt/sub-dialogue was triggered by mentioning the term "Rita" which, from long-term memory, the conversational assistant for conversational engagement recognized as a friend of the user. Based on this "friend mentioned memory match", another dialogue node from the dialogue workflow graph specification became active, triggering the question to confirm if this was the same person, and after confirmation/refutation, the previous dialogue thread about the current discussion topic ("Hiking") is continued.

The conversational assistant for conversational engagement is also able to trigger sub-dialogues based on event such as a CoughEvent—such a trigger can interrupt the current dialogue at any time, and the conversational assistant for conversational engagement will resume the main thread after returning from the interrupt. Here, the CoughEvent is also used to update the userHealthCondition on the user's profile individual in the ontology:

```
(Topic - ("I am sorry to hear that you are still coughing - hope that your
 cough is getting better soon!")
    tce1
    (:not-resumable t)
    (:intent-trigger "CoughEvent")
    (:next tce2)
    (:assert
        ("Coughing" (:concept "Myself") "userHealthCondition"))
    (:immediate-transition t))
(Topic - ("I'd like to get back at what we were talking about:"
    "Let's continue our chat:")
    tce2
    (:not-resumable t)
    (:no-polarity t)
    (:return t))
```

After the ":return", the interrupted dialogue thread continues at the point where it got interrupted. Moreover, any potential "input" that was provided along with the input/event that triggered the interrupt (i.e., coughing while answering a question) is processed after the return, such that the question is not being repeated.

The conversational assistant for conversational engagement's DSL can be extended as needed, e.g., for representing addition conditions on the dialogue topics/nodes, or specifying additional types of transitions and/or conditions on transitions. Some attributes such as ":no-polarity" control presentation and natural language generation features, for example, automatic whether the generated system response by polarity-based acknowledgements of the user.

The conversational assistant for conversational engagement's utterances are based on templates, in which variables can refer to profile information from the ontology, or from the utterance. For example, a follow-up dialogue with a user which had suffered from poor health (which was stored on the userHealthCondition slot on the user's profile by the conversational assistant for conversational engagement) might contain the following dialogue node, which checks on the user's current health:

```
(Topic - "Are you still bothered by
 $[currentUser.activeUser.userHealthCondition]
 that you told me about before?"
    check_health
    (:no-polarity t)
    (:condition
        ("currentUser"
            ("#!vicky:activeUser")
            ("#!vicky:userHealthCondition"))
    "#!vicky:NegativeHealthCondition")))
    (:utterance-domain
        ("No" user_health_good)
        ("Negative" user_health_good)
        ("Yes" user_health_bad)
        ("Positive" user_health_bad)))).
```

And, in case of a negative answer:

```
(Topic - "I'm glad to hear that you are no longer bothered by
$[currentUser.activeUser.userHealthCondition] that you told me about
before."
    user_health_good
    (:no-polarity t)
    (:immediate-transition t)
    (:condition
        ("currentUser"
            ("#!vicky:activeUser")
            ("#!vicky:userHealthCondition"
"#!vicky:NegativeHealthCondition")))
    ;; erase bad healthCondition from profile:
    (:assert
        ("#!owl:Nothing" (:concept "Myself") "userHealthCondition"))
    (:next user-continue-dialogue)).
```

Note, the microservices can be a variant of the service-oriented architecture (SOA) architectural style that structures an application as a collection of loosely coupled services. In the microservices architecture, the services can be fine-grained and the protocols are lightweight. A benefit of decomposing an application into different smaller services is that it improves modularity. The services in the microservice architecture (MSA) can communicate over a local network using technology-agnostic protocols such as HTTP.

Again, the conversational assistant for conversational engagement tracks both conversational topic awareness and user state awareness to create extended conversations with the user. The extended conversations reveal interests, emotional state, and health of user. The extended conversations could also potentially combat early onset dementia and loneliness.

FIGS. 3A-3D illustrate a flow diagram of an embodiment of a conversational engagement microservice platform containing the various modules that are configured to factor both i) a duration of a conversational engagement with the user and ii) attempt to maintain a positive experience for the user with the conversational engagement, where the dialogue management module cooperates with the user-model augmentation module to implement and maintain a flexible ontology relationship representation about the user that builds and stores learned metrics about the user over time with each conversational engagement and then in combination with the dialogue rules, drive the conversations in the conversational engagement with the user.

The method for the conversational assistant for conversational engagement may include many steps such as the following.

In step 302, the conversational assistant for conversational engagement platform receives metrics tied to a user in a dialogue management module of the conversational assistant for conversational engagement to understand a current topic and a user's emotions regarding the current topic and then adapting dialogue from the dialogue management module to the user based on dialogue rules factoring in these different metrics. The conversational assistant for conversational engagement contains various modules of at least a user-model augmentation module, a dialogue management module, and a user-state analysis input/output module that communicate and cooperate with each other in a conversational engagement microservice platform. Audio is streamed delivered to the conversational engagement microservice platform containing the various modules of the user-model augmentation module, dialogue management module, user state analysis input module, the information-extraction and topic-understanding input module, and the cough and respiratory health input module. The conversational engagement microservice platform distributes the audio to speech activity detection (SAD), cough/Respiratory Health detector, and Sensay speaker state including the emotion detector.

In step 304, the conversational assistant for conversational engagement extracts the metrics tied to the user through conversations with the user over multiple different periods of interaction.

In step 306, the conversational assistant for conversational engagement pushes or pulls state data for a speech-to-text process from a text-to-speech component. The speech activity detection detects speech and the user-state analysis input/output module filters to merely pull the speech audio out to the conversational engagement microservice platform. The conversational assistant for conversational engagement exchanges information with i) an automatic speech recognition (ASR) module to detect and comprehend the user's audio input as well as exchanges information with the text-to-speech component to generate audio responses and queries from the conversational assistant for conversational engagement platform. An entirety of a conversation of a current session is stored in a short term memory so that various modules of the conversational assistant for conversational engagement platform can analyze both i) a user's specific utterances in context to a current question and/or response and ii) the user's specific utterances in light of a context of the entirety of the conversation of the current session with the user 1) when deciding subsequent dialogues, 2) when deciding to change a current topic, and 3) when deciding how to continue the conversational engagement with the user. The ASR sends text representing the speech to the conversational engagement microservice platform as well as actual a voice recording to analyze respiratory health and tonality.

In step 308, the conversational assistant for conversational engagement adapts the conversational engagement with the user with the dialogue rules in order to factor both i) an attempt to extend a duration of a conversational engagement with the user and ii) an attempt to maintain a positive experience for the user with the conversational engagement.

In step 310, the conversational assistant for conversational engagement uses dialogue rules codified through a dialogue specification language to dynamically adapt between the conversational assistant for conversational engagement initiating i) a free-form casual conversation with the user and ii) a directed dialogue with the user on a specific topic, based on a current conversational context.

In step 312, the dialogue specification language enables expressive context-aware modeling of conversational content for end users in a textual language. The dialogue rules and branching structures to decide whether to continue on a current topic and when to transition off that topic but continue the engagement conversation with another topic are codified in the dialogue specification language. The conversational engagement microservice platform forwards the text to the VPA pipeline, NLP, part-of-speech-tagger, and polarity detector. The VPA pipeline consolidates various text input (e.g., from ASR, polarity detector, etc.) and sends to VPA. The VPA gets the request and passes the request to two micro services, hierarchical classifier and co-clustering. Hierarchical classifier returns possible Topic intents with the probability estimate and co-clustering returns the topic. If user's request for ending the conversation, user's request to change the topic, then do so.

In step 314, once a given topic is selected to be discussed, then the dialogue management module is configured to use dialogue rules to review i) an entire current conversation on that topic, ii) stored information on one or more previous conversations on that topic, and iii) stored information from linked topic nodes, as weighted factors to guide what a next question and/or response in the dialogue will be about; and then, utilize dialogue templates populated and derived from the above information to generate that dialogue. The conversational assistant for conversational engagement detects and keeps track of a topic ID, derived from hierarchical classifiers for topics and co-clustering of related topics, in order to correctly identify a set of topics that are discussed in a free-form conversation between the user and the conversational assistant for conversational engagement.

In step 316, the dialogue rules and branching structures uses the user state analysis to adapt the topic of the conversation to 1) points in that topic the user is amenable to and/or 2) points in another topic that the user is positive to and steer the conversation away from points in topics that the user state indicates negativity currently toward.

In step 318, the conversational assistant for conversational engagement maintains a flexible ontology relationship representation about the user that that builds and stores learned information about the user over time with each conversational engagement and then in combination with the dialogue rules drive the conversations with the user.

In step 320, the conversational assistant for conversational engagement creates and maintains one or more nodes for each of these topics in the flexible ontology relationship representation as well as link relationships between two or more topics tailored specific to the user.

In step 322, the conversational assistant for conversational engagement detects for and tracks, via storing in long term memory in the nodes, user-specific knowledge on two or more topics selected from a group consisting of 1) family and other people associated with this user, 2) concerns this user has expressed, 3) emotional state associated with this user, 4) auditorily-detectable health indicators associated with this user, and 5) interests associated with this user.

In step 324, each node in the flexible ontology relationship representation associated with this user is associated with a particular topic and has a link to a storage location of learned facts and other information about the topic associated with that node. One or more of the topic nodes and the stored learned facts are referenced by the dialogue management module to populate questions and/or responses in the dialogue when the dialogue management module dialogues with the user.

In step 326, the conversational assistant for conversational engagement monitors all dialogues with the user in order to monitor a current state of the user's health. The conversational assistant for conversational engagement references data stored on a prior history of the user's health condition through auditory assessment, including coughs, in a current or subsequent conversation session, when deciding when to change a current topic over to a topic on the user's health. While all the above runs, cough in parallel sends cough detection through the conversational engagement microservice platform to VPA pipeline independently and VPA adapts to the cough/Respiratory Health detector. If the person is coughing for a long time change the conversation thread.

FIG. 5a illustrates a diagram of an embodiment of an example workflow graph of an example ontology built for the conversational assistant for conversational engagement.

Again, the conversational assistant for conversational engagement's dialogue model may consist of hundreds of such nodes and edges to cover most conceivable dialogs and dialog situations between the user and the conversational assistant. Nodes can be triggered based on conditions, based on multi-modal inputs, dialogue state, and events. For example, certain dialogue topics/nodes might be triggered whenever a certain discussion topic comes up, when the user coughs or sneezes (here, an audio event could trigger a specific handler), or when certain friends or relatives or the user are mentioned. Each dialogue topic can have its own set of nodes the dialogue workflow graph 500 specified in the DSL can be compiled into an OWL representation, which is then interpreted by a set of OntoVPA rules, which act as an "interpreter" for the dialogue specification. A developer is free to edit and change OntoVPA's meta level architecture simply by adding, removing, or modifying rules, resulting in a change of the conversational interpreter logic as well as in the rules change specifics of how and when the VDA will move to nodes in this graph 500.

The example workflow graph 500 illustrates an embodiment of an example ontology that is very large with a lot of nodes and edges. A subset of the ontology built for the conversational assistant for conversational engagement will be discussed to show general principles. Also, this is merely an example of many possible conversational assistants for the conversational engagement platform.

An example explanation of how this graph 500 is traversed and how decisions are made follows. This subset of the ontology is along one or two paths merely in the example graph 500, but should be enough to outline the process in general. The example workflow graph 500 also illustrates how the dialogue workflow graph 500 enables contextually-aware dialogue with the conversational assistant for conversational engagement.

Also, in this example, a OntoVPA dialogue management system is used as an example implementation. The dialogue workflow graph 500 specifies the space of potential conversations a user can have with the conversational assistant for conversational engagement. Roughly, nodes correspond to system utterances, and transitions ("edges/links") between nodes are triggered based on different conditions and/or modalities.

For example, depending on a user's (explicit) answer, conditions and other modalities, to a given question, the answer, condition or other modality from the user's response will activate different successor nodes representing different system responses that can be triggered. Again, other modalities that represent non-explicit input from the user, can also trigger transitions in the nodes of the workflow graph 500. These other modalities include, for example, user's current sentiment and/or polarity to the utterance from the conversational assistant, as well as "events" currently occurring such as coughing.

In the following, the dialogue workflow graph 500 is discussed in graphical syntax here. However, the actual concrete syntax used for workflow graph 500 encoding is in terms of a Domain Specific Language (DSL), implemented as Common Lisp macros. These macros generate an instance-level representation of the workflow graph 500 as an OWL ontology, in terms of individuals and relationships between them, representing the "nodes and edges" of the graph 500. This instance-level OWL representation (the so-called ABox) is then operationalized (i.e., interpreted/executed) by the OntoVPA dialogue management system.

OntoVPA is an example ontology- and rule-based dialogue management system. OntoVPA uses OWL ontologies for the specification of the domain knowledge, speech acts and dialogue knowledge, and, most importantly, a dynamic OWL ontology for the runtime representation of the actual dialogue, including the full dialogue history for full reflexivity. Each utterance of the conversational assistant system and the user is represented on an instance level, as a speech act, instantiating speech act specific classes from the OWL ontology (e.g., there are classes for SystemUtterance, UserResponse, SystemQuestion, etc.)

The example decision tree and/or machine learning process outlines how and when decisions can be made to move forward with the conversation and on what topic, including what weights are accorded to different inputs, conditions, and factors, being tracked in the current conversation and light of previous conversations. How to determine next step given the policy of an OntoVPA-based dialogue system (e.g., what response is generated by the conversational assistant system for a given user utterance) is implemented by assessing the current state and context of the dialogue by evaluating ontology-based rules on the OWL-based dialogue representation. These rules (specified in SPARQL) then dynamically generate and assert new facts (=instances and relationships) into the runtime dialogue representation, hence generating system answers "on the fly".

A special-purpose dialogue system-specific ontology-based rule engine can be implemented in Java which 1) checks SPARQL dialogue rules, for applicability and weight assigned, in the rules for that Domain, 2) performs conflict resolution in case more than one rule is applicable, and 3) then executes ("fires") the selected rules. Fired rules then materialize their consequences (e.g., new instances and relationships) into the runtime OWL dialogue representation, representing the system's answer and other computed context information.

These OntoVPA rules can a) either directly implement a policy (=a mapping from user utterance to system response), or b) they can implement a generic "workflow graph interpreter" which uses the workflow graph 500 in combination with the current dialogue representation for computation of the system answer. The conversational assistant for conversational engagement's SPARQL rules are considered "meta" rules—they do not implement the policy directly, but an interpreter for a representation that represents the policy (the workflow graph). Hence, instead of hardcoding the policy as a fixed set of dialogue rules, the conversational assistant uses the "policy as data workflow graph" representation to enable rapid and user friendly content creation with a DSL that requires no knowledge of SPARQL or OWL. The workflow graph 500 representation approach results in much reduced code base size, modeling/content authoring complexity, and development time required.

The following graph portions each showing a subset of nodes and edges in FIGS. 5b-5i and explanations occur in a top-down fashion for a first example Domain and subject within that Domain, such as a user's name. There are two parts: unknown user, and known/returning user in that Domain.

Figure 5B:
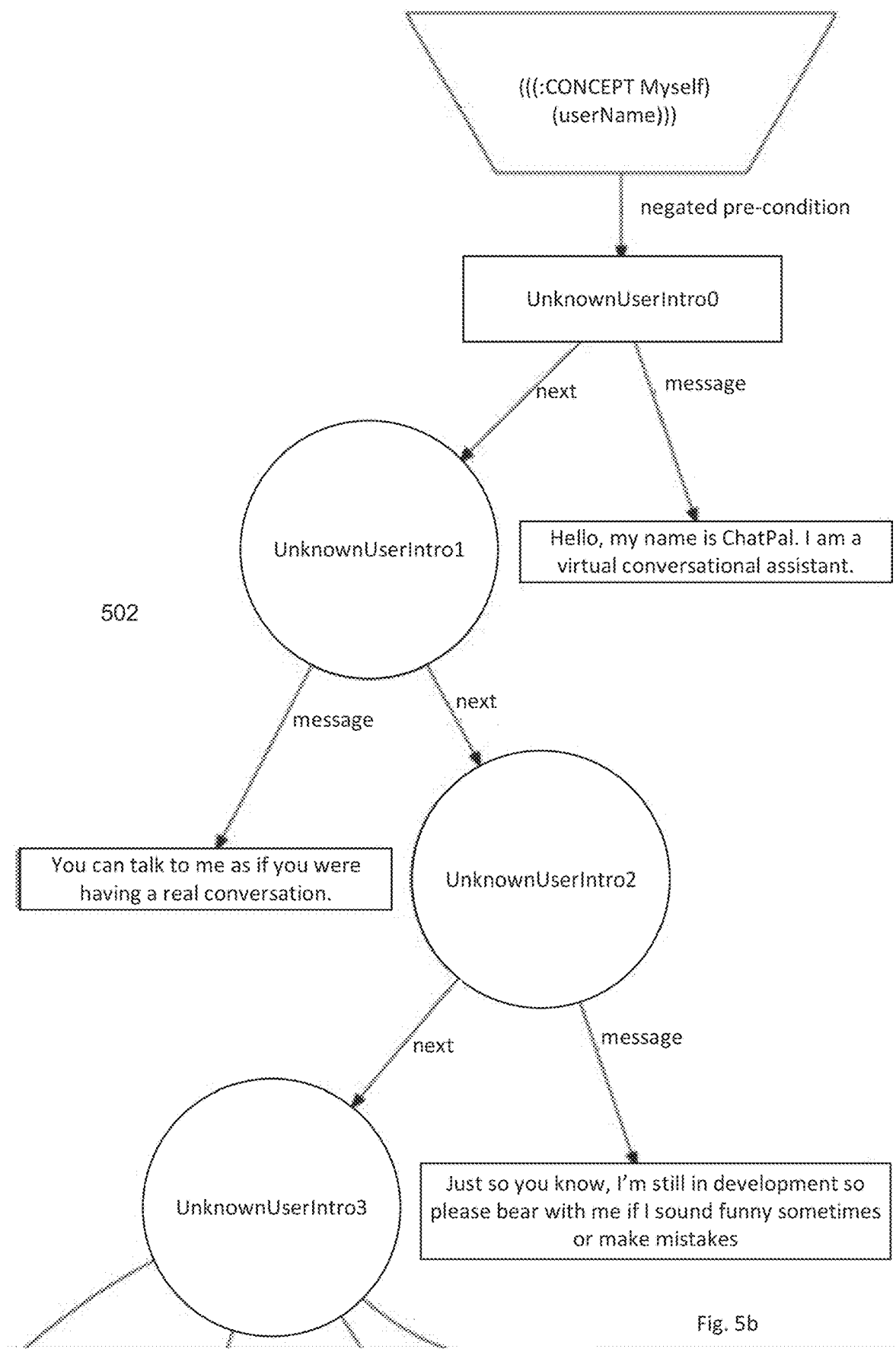

FIG. 5b illustrates a diagram of an embodiment of an example subset of the ontology for the conversational assistant.

Part 1—Subset of nodes for Getting to Know the User

The topic domain is (:CONCEPT Myself/User) and ultimately the conversational assistant wants to look up the last User Session Summary stored in memory and the last Session Summary Topic Category Activity. However, the conversational assistant needs initially to get to know about each user of the one or more users who can use and interact with the conversational assistant; and accordingly, will proceed done a path of nodes in the ontology for the conversational assistant. An example first subset of nodes 502 for the conversational assistant to get to know the user are shown.

Step 1

A new user unknown to the conversational assistant for conversational engagement logs into the system. The node Unknown User Intro0 is labeled to be a "dialogue start node". In addition, a negated Precondition edge specifies that this node can only be activated if the user Name attribute (property) on the current users' profile data record (:CONCEPT myself) is not known yet. In this case, the Unknown User Intro0 node becomes activated, and its associated message is uttered by the system ("Hello, my name is the conversational assistant for conversational engagement . . . ") Moreover, some nodes down this tree, such as node Unknown User Intro0 to node Unknown User Intro2, are weighted to not return the floor to the user immediately yet, i.e., the conversational assistant does not stop to accept user input after uttering the message associated with Unknown User Intro0 node, but rather immediately transitions to the next applicable dialog node. The next active dialog node is, in general, computed by using any number of mechanisms as explained in the intro. In case there are no further conditions on the transitions specified, the next relationship/edge is being employed. Hence, the conversational assistant for conversational engagement transitions to the next node in the graph of Unknown User Intro1, uttering the associated message ("You can talk to me . . . "), then to the next node in the graph Unknown User Intro2 ("Just so you know, . . . "), and returns the possibility of the user being able to hold the conversational floor to the user, i.e., stops, after processing node Unknown User Intro3. (Note, additional nodes could come after the third edge coming out of UnknownUserintro3 node but are not need to show this principle in this example.

Step 2

Figure 5C:
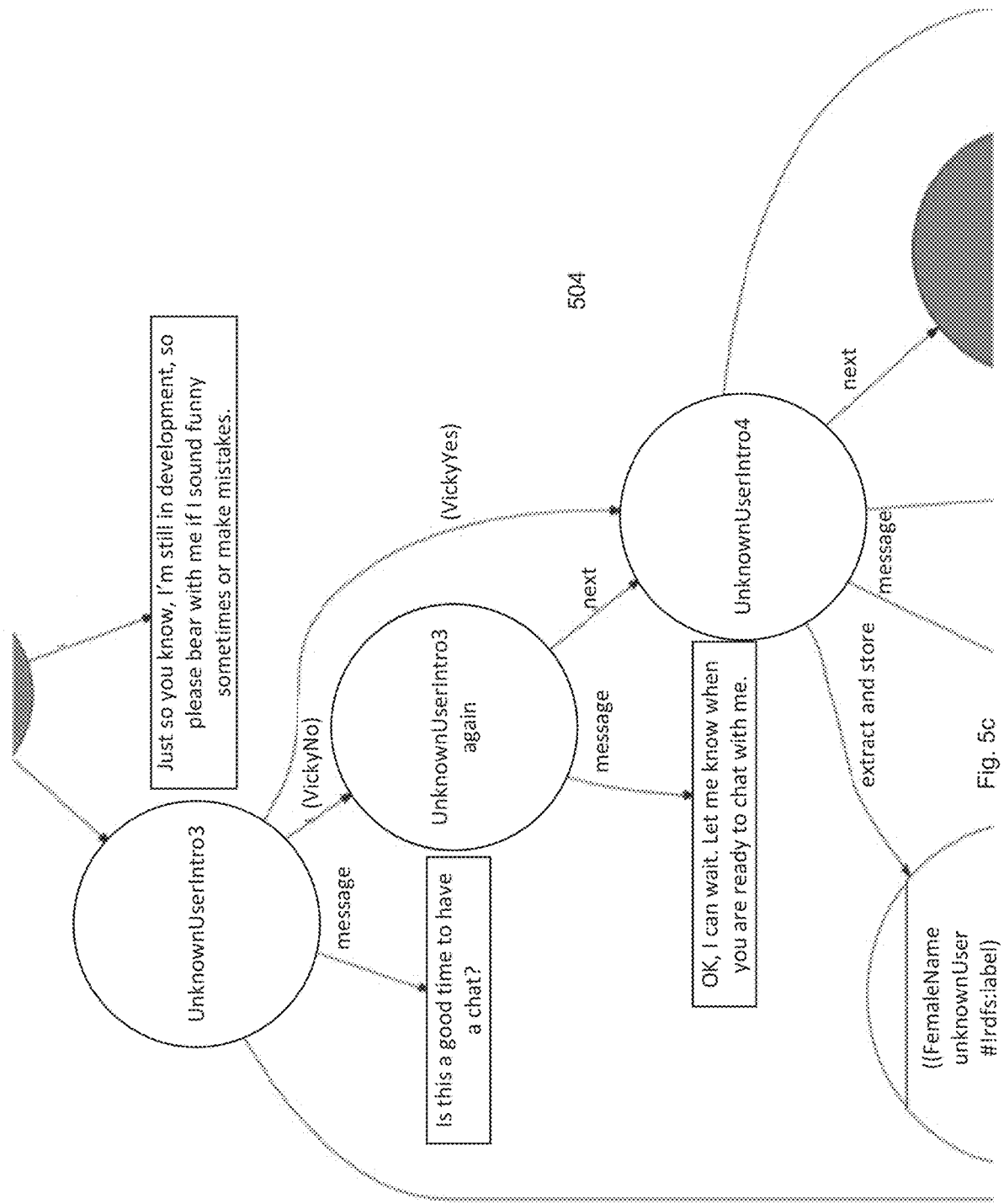

FIG. 5c illustrates a subsequent diagram of an embodiment of an example second subset of nodes 504 of the ontology for the conversational assistant. The conversational assistant for conversational engagement in a node Unknown User Intro3 utters a question—"Is this a good time to have a chat?". The conversational floor ("speech token") is returned to the user, i.e., the conversational assistant for conversational engagement pauses any speaking and is now waiting for input. There are an example number of two different successor nodes now.

The conversational assistant for conversational engagement determines when the user's response can be classified as affirmative, i.e., being subsumed by the VickyYes concept in the ontology (this encompasses utterances such as "Sure", "Ok", "okay", "Yes", "You bet", "Why not", "alright", "sure thing", and many more), then the conversational assistant transitions to node Unknown User Intro4; note that this node is reached by traversing the VickyYes edge.

Conversely, the conversational assistant for conversational engagement determines when the user indicates that she/he is not ready for the chat, then the node Unknown User Intro3 Again is reached over the VickyNo edge, and the conversational assistant can assume ("OK, I can wait . . . ") and/or issue a backchannel, and determines whether the next utterance of the user indicates a readiness for the chat, hence also transitioning to the Unknown User Intro4 node.

Step 3

Figure 5D:
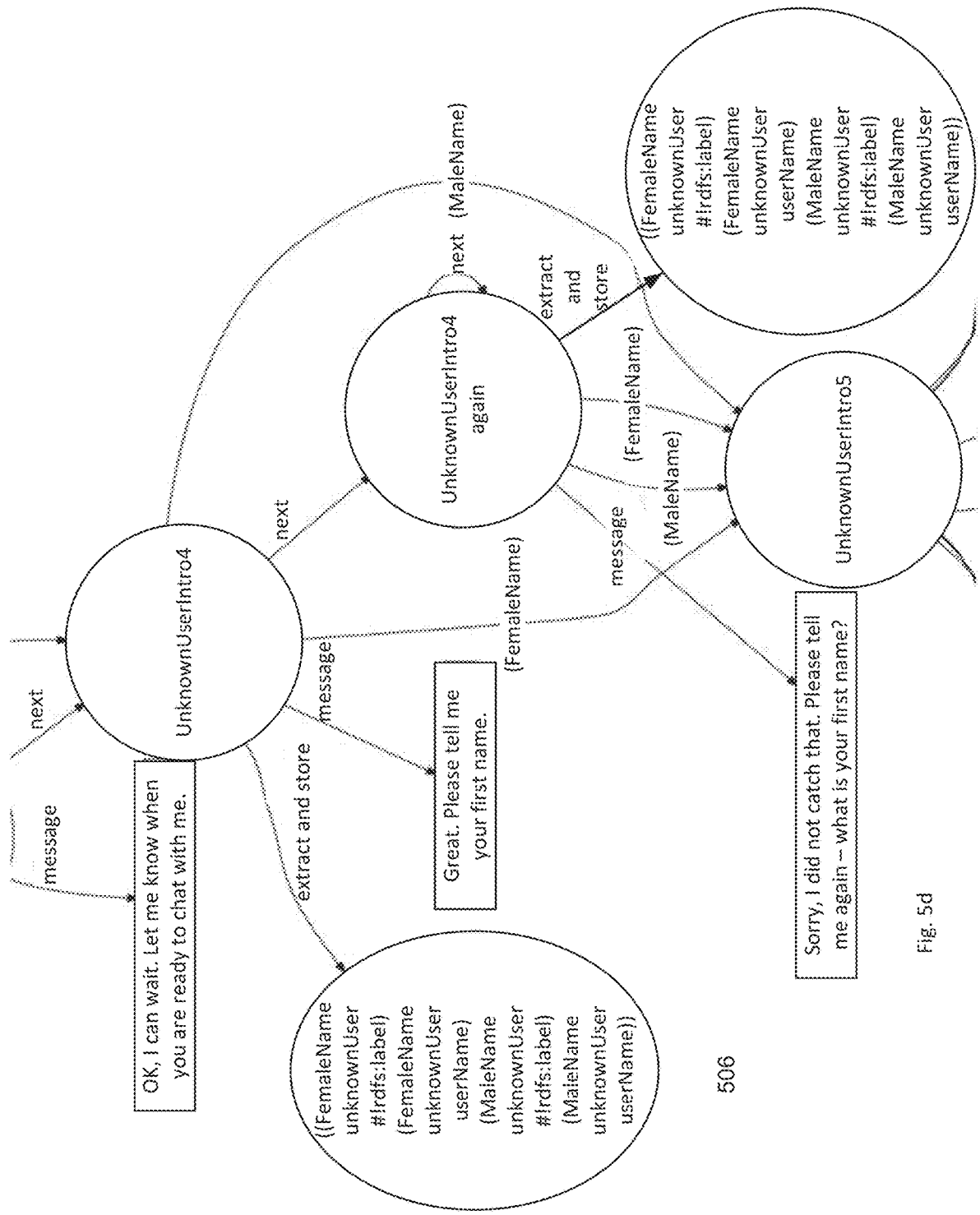

FIG. 5d illustrates a subsequent diagram of an embodiment of an example third subset of nodes 506 in the ontology for the conversational assistant. The conversational assistant for conversational engagement is now ready to learn the user's name. The utterance associated with Unknown User Intro4 is "Great. Please tell me your first name". The conversational assistant for conversational engagement's ontology-based parser has a database of the most common, for example, 1000 first names in the U.S.A. Hence, any utterance made by the user that is classified by the ontology-based natural language understanding system under the concepts FemaleName, TheyName, or MaleName will transition the conversational assistant to node Unknown User Intro5; and then note the corresponding edges in the graph. Next, the user profile/state ("list of learned facts") of the conversational assistant will be updated. This node is reachable via the edge extract and store describes the updates based on the "extracted" male or female name to the knowledge base/user profile; the details of the specification are not important, but it is expressed that the extracted FemaleName utterance (resp. MaleName or TheyName utterance) is being asserted as an attribute (property) value on the user profile's data record, which gets saved with the session; hence, from now on, the user is known to the conversational assistant. Also note that, when the utterance is neither classified as MaleName, TheyName, nor Female-Name (i.e., was not intelligible to the conversational assistant for conversational engagement), that then the next default transition from UnknownUserintro4 to UnknownUserintro4Again is being taken, and the conversational assistant utters "Sorry, I didn't catch that. Please tell me again—what is your first name?". The UnknownUserintro4Again node can only be left when a name was finally recognized; otherwise, it continues to ask for the name again. Note that UnknownUserintro4Again is its own next successor, and that the next edge will only be used if no other transition is possible.

Step 4

Figure 5E:
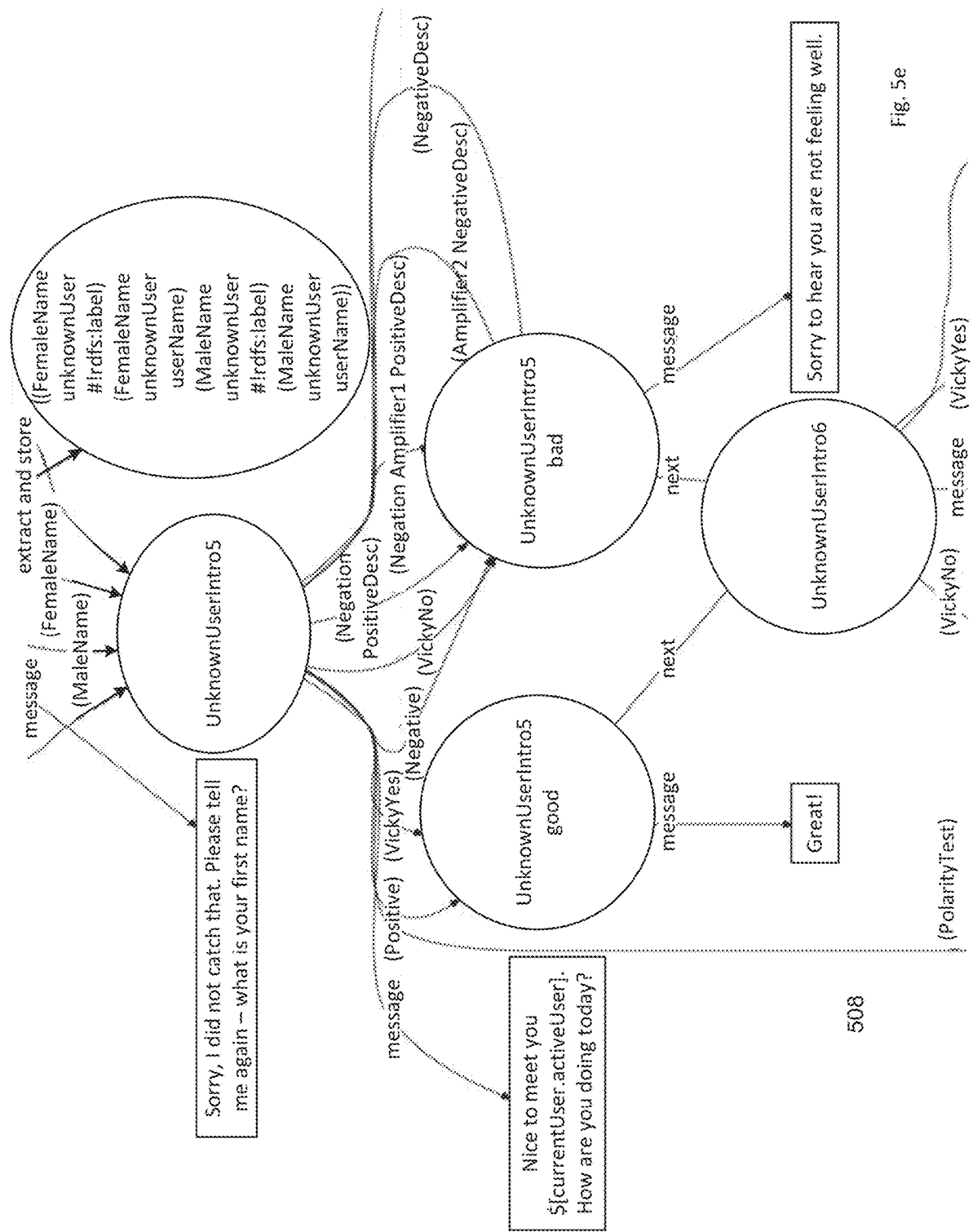

FIG. 5e illustrates a subsequent diagram of an embodiment of an example fourth subset of nodes 508 in the ontology for the conversational assistant. The conversational assistant for conversational engagement determines that the dialogue state has arrived at node Unknown User Intro5— "Nice to meet you $[currentUser.activeUser]. How are you doing today?" This illustrates the use of stored/learned information in natural language generation templates ($[<path expression>] notation). The active user's first name was just extracted and stored in the previous step on the user profile data record and is being accessed here. The conversational assistant is now waiting for an answer from the user to the "How are you doing today?" question. Now, any utterance that can be classified as simply Positive ("Great", "Fine", "Awesome", . . . ) by the ontology, or which can be classified as a sequence of ontology-concepts as specified, e.g., the utterance "not very good" can be classified as the sequence of ontology concepts (Negation Amplifier1 PositiveDesc1). Note that there are various "ontology-based grammar" expressions of this kind specified on different edges). This will transition the conversational assistant into either UnkownUserIntro5good (meaning the user is doing fine today), or into UnkownUserintro5bad (representing that the user is not doing fine). Notice that the conversational assistant could also transition based on other modalities input into these states; i.e., when the user is coughing, this would trigger a transition to UnkownUserintro5bad. These additional transition possibilities will simply manifest as additional edges between nodes/states. Depending on the node being reached, the conversational assistant either utters "Great!" or "Sorry to hear you are not feeling well".

Each time the conversational assistant transitions to a given node of the many possible nodes in the graph, the conversational assistant determines which node based on factoring weights and current conditions. For example, when the conversational assistant detects a cough for the user but responds to a question or spontaneously indicates "I'm doing great!". The conversational assistant also has a separate set of rules to handle how and when to determine which node when contradictory conditions exist.

As mentioned above, the workflow graph is being operationalized (i.e. interpreted"/executed) using a set of generic workflow interpreter rules (in SPARQL). The SPARQL rules look at and weight different factors and conditions, such as the current dialogue step, knowledge base state (including user profile information) and history of the dialogue (=the "dynamic unrolling of the dialogue graph+the representation of user utterances in terms of speech acts etc.), and then determines which nodes are applicable for the next system utterance. Then, based on the situation, the precedence of successor nodes is coded in the interpreter rules. For example, "interrupt"-based activated nodes have highest priority, then edges that transition based on user input and/or polarity, then the "next" edge between nodes, etc. This merely matters when, in a given situation, more than one successor node can become the next step. Hence, conflict resolution will occur per the details in the SPARQL "interpreter" rules for that Domain.

There is a level of rules that handles the "raw input". The mechanism in this "preprocessing SPARQL rule layer" goes roughly as follows:
  1) if no change in topic domain is detected, then use the "currently active" topic domain. This is the "topic domain" attribute value on the user profile. So per user, the conversational assistant keeps track of the "current"/"most recently discussed" topic.
  2) if a change in topic domain comes from the user's utterance, e.g., the conversational assistant is certain that that instead of "hiking", the user is actually now talking about "knitting", because ontology has spotted this, then the slot value of the "current topic" on the user profile is changed by the preprocessing rule. This triggers a "topic domain" activation of nodes such as Ta0 (which triggers on Activity).
  3) likewise, if co-clustering provides a topic with high certainty, then another preprocessing rule (of lowest priority) will make the same change as the ontology-based one above, by changing the "current topic" value on the user profile.

So the preprocessing rules do some conflict resolution and decide when the information is "reliable enough" to change/overwrite the current user topic on the profile. Sometimes, the rules also explicitly DISABLE potential topic changes, with a "don't change topic" marker on the node. This prevents false "topic change alerts" from noisy co-clustering. In general, the rules for the conversational assistant are weighted such that, once the conversational assistant "determines and logs in" the topic for that session, then that topic stays within that Domain unless the user makes it expressly clear they are changing the topic. Each time, a topic can change with the next session. Again, the conversational assistant stores and tracks what that user and the conversational assistant have previously discussed.

Again, the workflow graph is being operationalized using a set of generic workflow interpreter rules (in SPARQL). In case more than one workflow graph successor nodes become activated, for example, both coughing occurred AND the user was saying "I am feeling great" in the same time window, then a form of conflict resolution strategy is utilized. This conflict resolution strategy is either implemented in the rule interpreter (=the workflow graph interpreter) in the rules itself, or within the workflow graph DSL textually (e.g., using a "left to right" precedence ordering for specified successor nodes) In the rule engine, the usual conflict resolutions strategies are implemented, including: most specific first, defeasibility of rules defined in terms of a "defeats" partial ordering relation between rules, specifying that one rule has higher priority than another applicable (e.g. the defeated one), etc.

Also note that the conversational assistant has a special workflow graph construct for defining "trigger" nodes; these can occur at any time and can serve as interrupts to the current dialogue. For example, a coughing event can trigger an interrupt, which is usually weighted to interrupt to the current dialogue. This will transition the workflow to a different node in the graph that handles this event. For example, for a coughing event, the conversational assistant might say "Sorry to hear that you are still coughing! Are you okay to continue our chat?", and then the dialogue would return to its previous state and resume the dialogue by repeating the last system utterance (or question) based on the user's positive affirmation.

Given that such an event (like coughing) can occur at any node in the workflow graph at any time, it is not reasonable to model it using an anticipated "edge" in the graph. Each workflow graph node would require an outgoing CoughingEvent edge then. Instead, the conversational assistant uses a special "interrupt handler" construct and the corresponding subgraph becomes active as soon as the event happens. This is shown in the diagram in FIG. 5f.

Figure 5F:
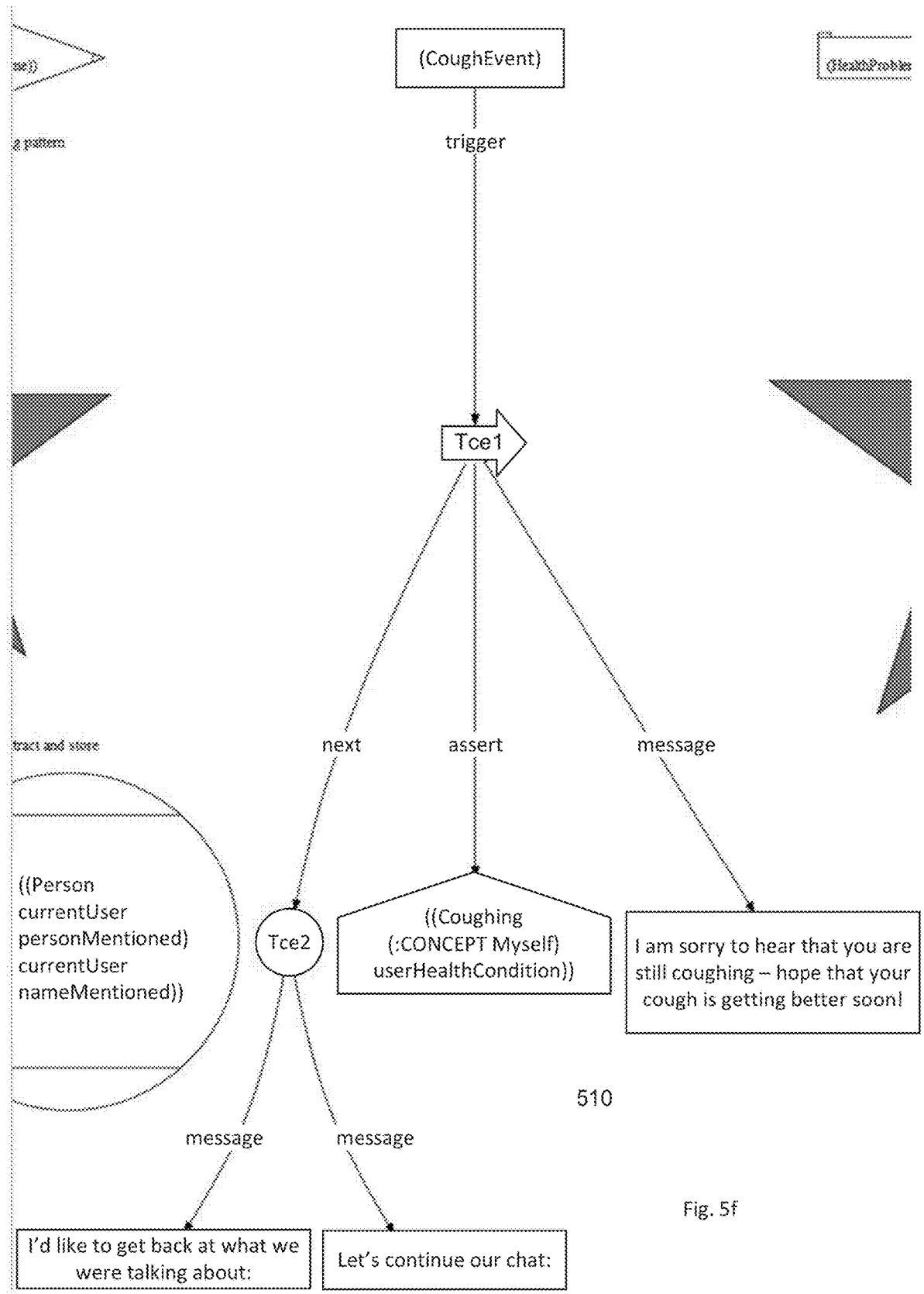

FIG. 5f illustrates a subsequent diagram of an embodiment of an example fifth subset of nodes 510 in the ontology for the conversational assistant. The idea is that the current dialogue is interrupted when one or more specified events happen (such as a CoughEvent trigger), and control is automatically returned to the previous node (here, node Tce2) when the node has a "return to caller" attribute that has been specified for this node.

Step 5

Figure 5G:
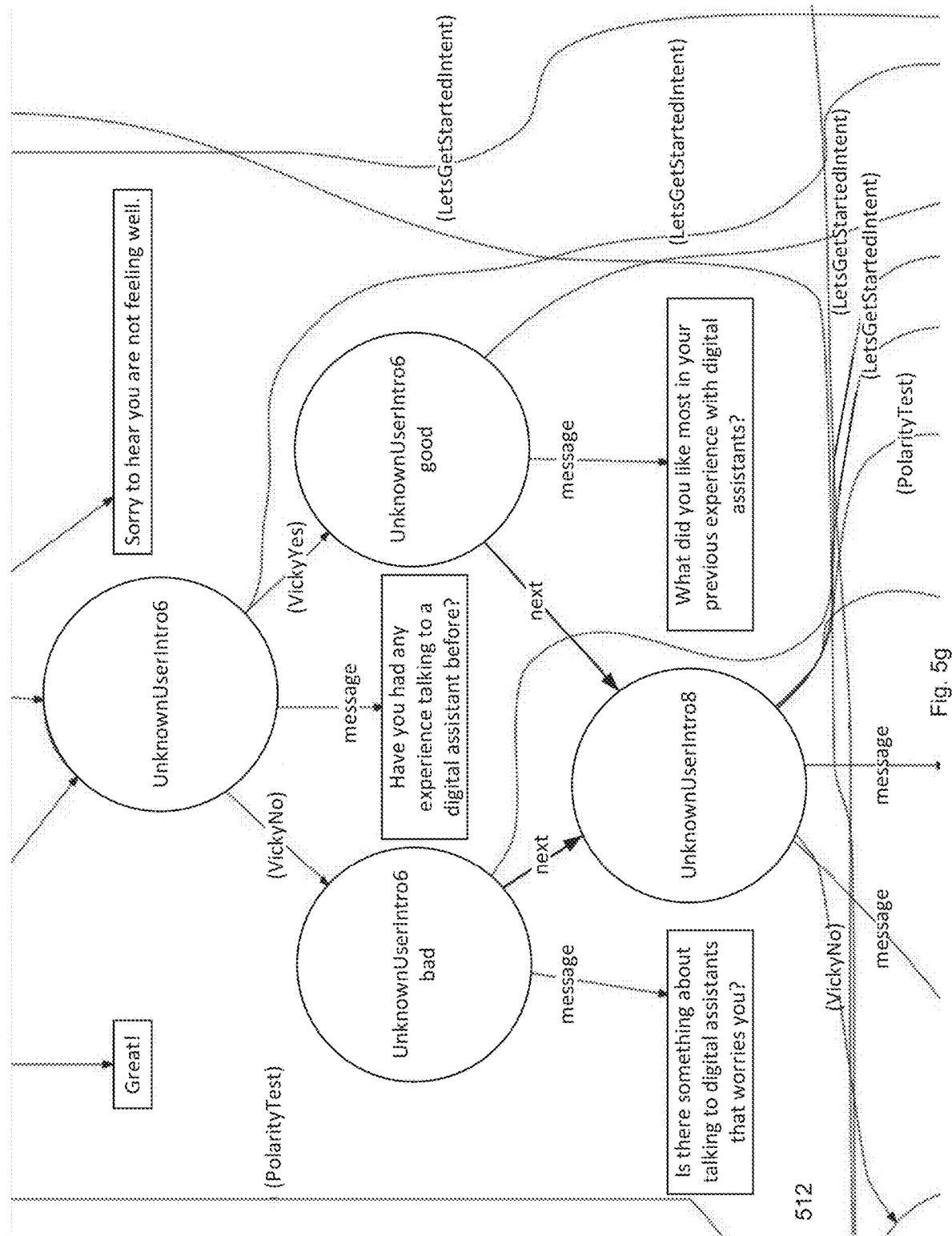

FIG. 5g illustrates a subsequent diagram of an embodiment of an example sixth subset of nodes 512 in the ontology for the conversational assistant.

The conversational assistant for conversational engagement determines that now that the conversational assistant knows about the name and the (un-well-being or) well-being of the user, it continues its introduction by asking a couple of simple questions to get the user familiarized and mitigate and address potential anxiety (introductory "chit chat"). The dialogue progresses using the techniques described herein.

The conversational assistant for conversational engagement is configured to handle when a user might shortcut or choose not to answer these questions. Accordingly, the edge labeled Lets Get Started Intent initiates a transition that bypassed the chit chat when a user acts impatiently, i.e., by saying "Come on, enough with this!" or "Let's get started!" or similar. Again, other modalities other than speech, e.g., rolling of the eyes of the user as detected by the camera, cursing, or similar, are classified on how to be interpreted under the Lets Get Started Intent node and hence also conceivably triggers the transition.

Step 6

FIGS. 5h-A and 5h-B illustrate a subsequent diagram of an embodiment of an example seventh subset of nodes 514 and eighth subset of nodes 516 in the ontology for the conversational assistant. The conversational assistant for conversational engagement is configured in the graph of nodes, after enough introductory chit chat has occurred, the conversational assistant arrives at an "engaging" question—the Ta0 node: "I am wondering if there is a hobby or some kind of activity that you particularly enjoy."

The conversational assistant for conversational engagement is configured to now perform ontology-based keyword spotting on a user's utterance during the conversational engagement with the user. If the user replies with any utterance that contains a word (mapped to an ontology concept) that is being subsumed by the Activity ontology concept, then the conversational assistant triggers a dialog about that specific activity. The ontology contains hundreds of sub-concept/sub-classes of Activity (for example, Knitting, Hiking).

Moreover, the ontology specifies a taxonomy that allows the conversational assistant to structure the activities, i.e., Knitting is specified under Crafts under IndoorActivities, whereas Hiking is classified under OutdoorHobbyActivities. Knowing that Hiking is an outdoor activity, the conversational assistant can trigger a different, more specific dialog about the Activity (only knowing that Hiking is an Activity—without knowing that it is indeed an OutdoorHobby—would, for example, not allow us to intelligently ask: "What do you do when the weather is bad?").

In addition to performing ontology-based keyword spotting, the conversational assistant also leverages machine learning-based classifiers, e.g., co-clustering for topic detection, to infer that the user is talking about an Activity.

Again, a "preprocessing SPARQL rule layer" goes roughly as follows:
1) when no change in topic domain detected, use the "currently active" topic domain.
2) when a change in topic domain comes from a user utterance, e.g., the conversational assistant is certain because the user expressly makes this clear or because ontology has spotted this, then the slot value of the "current topic" on the user profile is changed by the preprocessing rule.
3) likewise, when co-clustering provides a topic with high certainty, then another preprocessing rule (of lowest priority) will make the same change as the ontology-based one above, by changing the "current topic" value on the user profile.

Interrupt events will interrupt a current conversation and its topic for the moment, and change over to a specific set of nodes to address the interrupt situation, such as a cough.

Thus, the preprocessing rules do some conflict resolution and decide when the information is "reliable enough" to change/overwrite the current user topic on the profile.

Again, different conflict resolution strategies can be employed in case co-clustering should detect a different topic than ontology-based keyword spotting. As explained before, these resolution strategies can either be implemented on the workflow graph rule interpreter level, or by using preference and ordering constraints in the workflow graph DSL (which are then of course respected by the corresponding interpreter rules).

The conversational assistant triggers a change in "conversation topic", and a "topic domain" trigger is employed to accommodate different modalities (e.g. ontology-based topic understanding and co-clustering-based topic detection). See the next step.

Step 7

Figure 5I:
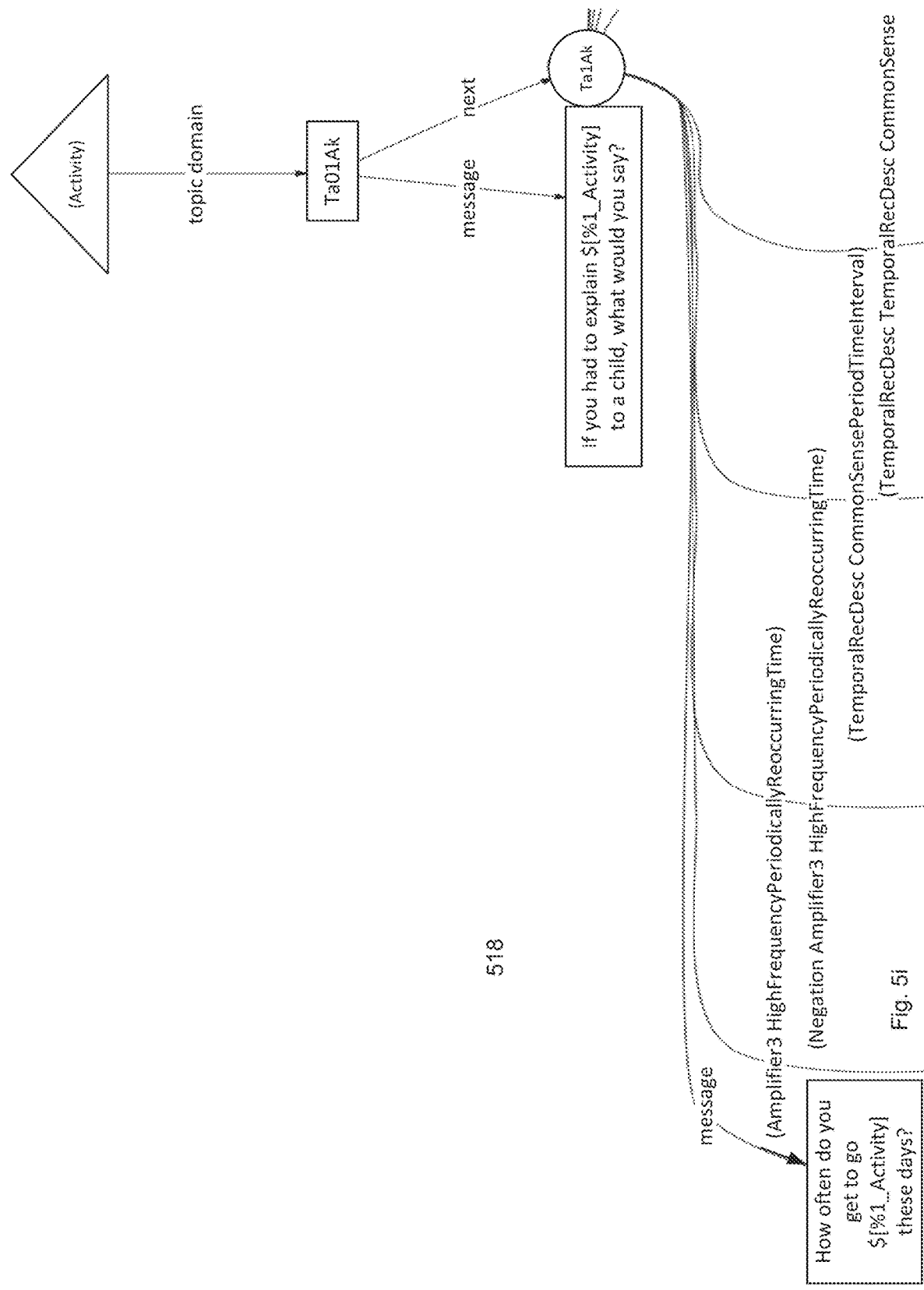

FIG. 5i illustrates a subsequent diagram of an embodiment of an example ninth subset of nodes 518 in the ontology for the conversational assistant. Again, the ontology specifies a taxonomy that allows the conversational assistant to structure the Activities, i.e., Knitting is specified under Crafts under IndoorActivities, whereas Hiking is classified under OutdoorHobbyActivities. The conversational assistant for conversational engagement is configured in the graph of nodes, where a Ta01Ak node is conditioned on the topic domain Activity. This "topic domain trigger" is shaped as a triangle in the graph (labeled Activity). Hence, the conversational assistant can merely make the transition to Ta01Ak when the current topic is subsumed under Activity in the ontology.

For example, let's say the user said, "I like to knit" or "I like going on the trails in the mountains". The former might be classified by the ontology using ontology-based word classification ("Knit"→Knitting activity concept), and the latter might be classified using co-clustering under the Hiking concept ("trails~hiking"). Using Ta01Ak, the conversational assistant responds with another NLG (output) template involving a reference to the utterance (or topic) that has been classified under Activity, using the %1_Activity placeholder/template variable. Hence, the reply might be "If you had to explain Hiking to a child, what would you say?" or, "If you had to explain Knitting to a child, what would you say?" Note that this demonstrates significant inference, i.e., in the case of co-clustering based topic detection/classification, going from "trails in the mountains" to "Hiking" is a significant inference step and demonstrates significant understanding and context-awareness of the conversational assistant.

The conversational assistant can then transition through a set of questions, including Tal Ak "How often do you get to go Hiking these days, etc. The answer to this can involve complex temporal expressions, e.g., "twice a week", and an ontology-based grammar transitions to the next nodes (e.g., using ontology-based sequence/grammar expressions as discussed in Step 4).

Network

Figure 7:
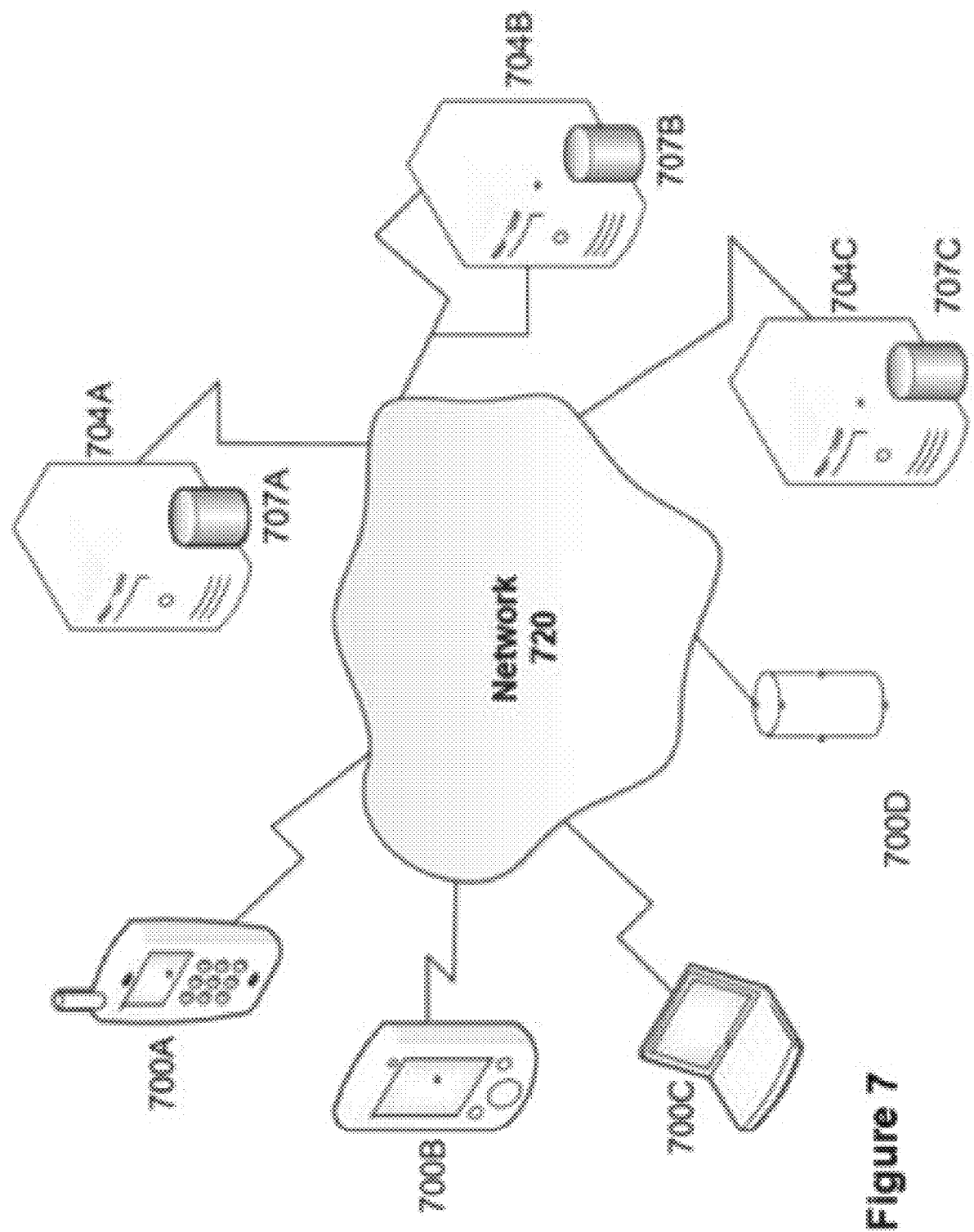
FIG. 7 illustrates a block diagram of a number of electronic systems and devices communicating with each other in a network environment in accordance with an embodiment of the conversational assistant for conversational engagement platform.

FIG. 7 illustrates a block diagram of a number of electronic systems and devices communicating with each other in a network environment in accordance with an embodiment of the conversational assistant for conversational engagement platform.

The network environment has a communications network 720 that connects server computing systems 704A through 704C, and at least one or more client computing systems 700A to 700D including the conversational assistant for conversational engagement 700D. As shown, there may be many server computing systems 704A through 704C and many client computing systems 700A to 700D connected to each other via the network 720, which may be, for example, the Internet. Note, that alternatively the network 720 might be or include one or more of: an optical network, a cellular network, the Internet, a Local Area Network (LAN), Wide Area Network (WAN), satellite link, fiber network, cable network, or a combination of these and/or others. Each server computing systems 704A-704C also have circuitry and software to communication with each other across the network 720. Each server computing systems 704A to 704C may be associated with one or more databases 706A to 706C. Each server 704A to 704C may have one or more instances of a virtual server running on that physical server and multiple virtual instances may be implemented by the design. A firewall may be established between a client computing system, for example, 700D and the network 720 to protect data integrity on the client computing system 700D.

A cloud provider service can install and operate application software in the cloud and users can access the software service from the client devices. Cloud users who have a site in the cloud may not solely manage the cloud infrastructure and platform where the application runs. Thus, the servers and databases may be shared hardware where the user is given a certain amount of dedicated use of these resources. The user's cloud-based site is given a virtual amount of dedicated space and bandwidth in the cloud. Cloud applications can be different from other applications in their scalability which can be achieved by cloning tasks onto multiple virtual machines at run-time to meet changing work demand. Load balancers distribute the work over the set of virtual machines. This process is transparent to the cloud user, who sees only a single access point.

The cloud-based remote access is coded to utilize a protocol, such as Hypertext Transfer Protocol (HTTP), to engage in a request and response cycle with both a mobile device application resident on a client device as well as a web-browser application resident on the client device. The cloud-based remote access for a wearable electronic device, can be accessed by a mobile device, a desktop, a tablet device, and other similar devices, anytime, anywhere. Thus, the cloud-based remote access to a wearable electronic device hosted on a cloud-based provider site is coded to engage in 1) the request and response cycle from all web browser based applications, 2) SMS/twitter based request and response message exchanges, 3) the request and response cycle from a dedicated on-line server, 4) the request and response cycle directly between a native mobile application resident on a client device and the cloud-based remote access to a wearable electronic device, and 5) combinations of these.

In an embodiment, the server computing system 704A may include a server engine, a web page management component, a content management component, and a database management component. The server engine performs basic processing and operating system level tasks. The web page management component handles creation and display or routing of web pages or screens associated with receiving and providing digital content and digital advertisements. Users may access the server-computing device by means of a URL associated therewith. The content management component handles most of the functions in the embodiments described herein. The database management component includes storage and retrieval tasks with respect to the database, queries to the database, and storage of data.

Computing Devices

Figure 6:
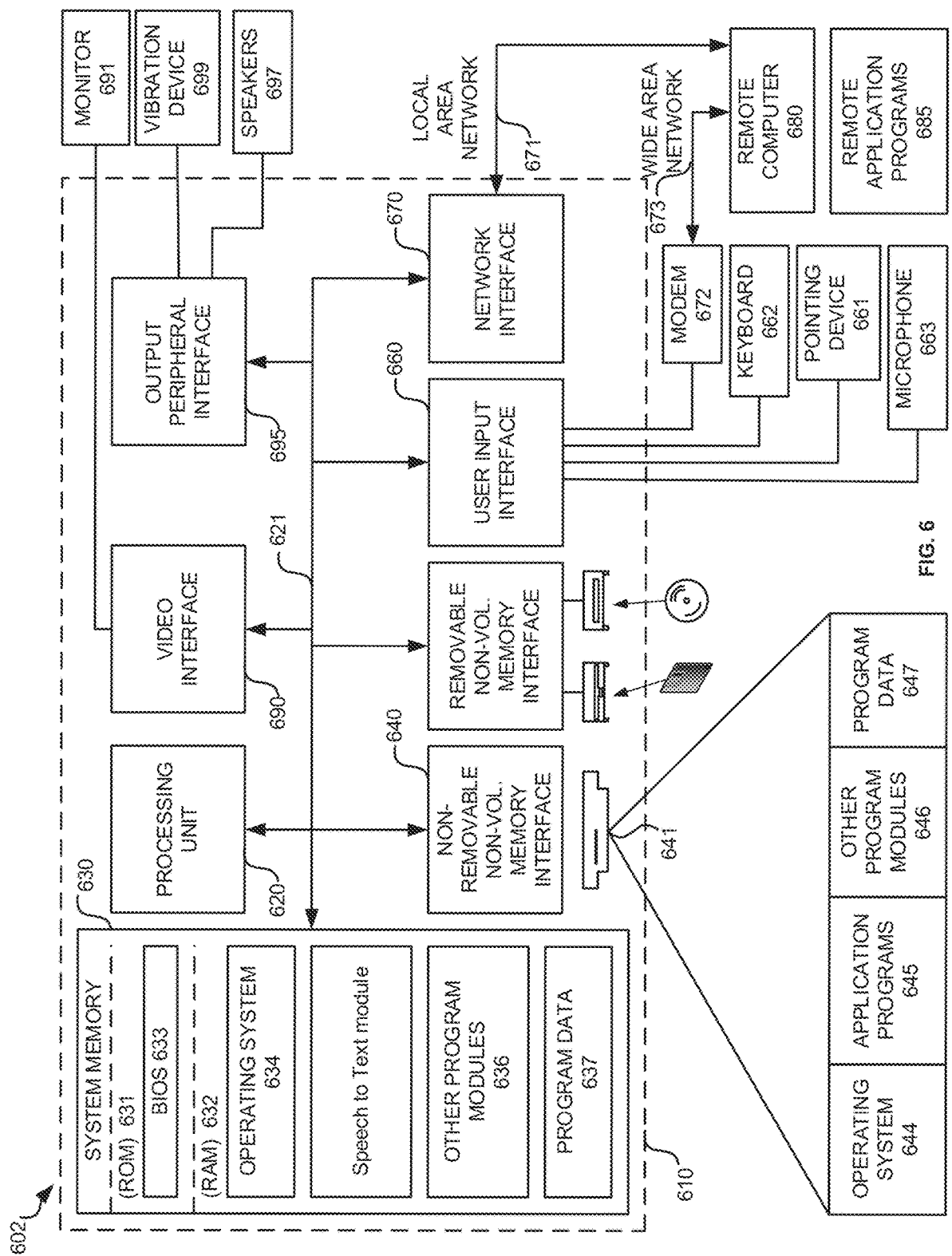
FIG. 6 illustrates a block diagram of an embodiment of one or more computing devices that can be a part of the conversational assistant for conversational engagement and its associated modules discussed herein.

FIG. 6 illustrates a block diagram of an embodiment of one or more computing devices that can be a part of the conversational assistant for conversational engagement and its associated modules discussed herein.

The computing device may include one or more processors or processing units 620 to execute instructions, one or more memories 630-632 to store information, one or more data input components 660-663 to receive data input from a user of the computing device 602, one or more modules that include the management module, a network interface communication circuit 670 to establish a communication link to communicate with other computing devices external to the computing device, one or more sensors where an output from the sensors is used for sensing a specific triggering condition and then correspondingly generating one or more preprogrammed actions, a display screen 691 to display at least some of the information stored in the one or more memories 630-632 and other components. Note, portions of this design implemented in software 644, 645, 646 are stored in the one or more memories 630-632 and are executed by the one or more processors 620. The processing unit 620 may have one or more processing cores, which couples to a system bus 621 that couples various system components including the system memory 630. The system bus 621 may be any of several types of bus structures selected from a memory bus, an interconnect fabric, a peripheral bus, and a local bus using any of a variety of bus architectures.

Computing device 602 typically includes a variety of computing machine-readable media. Machine-readable media can be any available media that can be accessed by computing device 602 and includes both volatile and non-volatile media, and removable and non-removable media. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 602. Transitory media such as wireless channels are not included in the machine-readable media. Machine-readable media typically embody computer readable instructions, data structures, and other executable software.

In an example, the volatile memory 641 is illustrated for storing portions of the operating system 644, application programs 645, other executable software 646, and program data 647.

A user may enter commands and information into the computing device 602 through input devices such as a keyboard, touchscreen, or software or hardware input buttons 662, a microphone 663, a pointing device and/or scrolling input component, such as a mouse, trackball or touch pad 661. The microphone 663 can cooperate with speech recognition software. These and other input devices are often connected to the processing unit 620 through a user input interface 660 that is coupled to the system bus 621, but can be connected by other interface and bus structures, such as a lighting port, game port, or a universal serial bus (USB). A display monitor 691 or other type of display screen device is also connected to the system bus 621 via an interface, such as a display interface 690. In addition to the monitor 691, computing devices may also include other peripheral output devices such as speakers 697, a vibration device 699, and other output devices, which may be connected through an output peripheral interface 695.

The computing device 602 can operate in a networked environment using logical connections to one or more remote computers/client devices, such as a remote computing system 680. The remote computing system 680 can a personal computer, a mobile computing device, a server, a router, a network PC, a peer device or other common network node, and typically includes many or all of the elements described above relative to the computing device 602. The logical connections can include a personal area network (PAN) 672 (e.g., Bluetooth®), a local area network (LAN) 671 (e.g., Wi-Fi), and a wide area network (WAN) 673 (e.g., cellular network), but may also include other networks such as a personal area network (e.g., Bluetooth®). Such networking environments are commonplace in offices, enterprise-wide computer networks, intranets and the Internet. A browser application and/or one or more local apps may be resident on the computing device and stored in the memory.

When used in a LAN networking environment, the computing device 602 is connected to the LAN 671 through a network interface 670, which can be, for example, a Bluetooth® or Wi-Fi adapter. When used in a WAN networking environment (e.g., Internet), the computing device 602 typically includes some means for establishing communications over the WAN 673. With respect to mobile telecommunication technologies, for example, a radio interface, which can be internal or external, can be connected to the system bus 621 via the network interface 670, or other appropriate mechanism. In a networked environment, other software depicted relative to the computing device 602, or portions thereof, may be stored in the remote memory storage device. By way of example, and not limitation, remote application programs 685 as reside on remote computing device 680. It will be appreciated that the network connections shown are examples and other means of establishing a communications link between the computing devices that may be used.

It should be noted that the present design can be carried out on a computing device such as that described with respect to this Figure. However, the present design can be carried out on a server, a computing device devoted to message handling, or on a distributed system in which different portions of the present design are carried out on different parts of the distributed computing system.

Note, an application described herein includes but is not limited to software applications, mobile applications, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C++, HTTP, Java, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both. A module may be implemented in hardware electronic components, software components, and a combination of both.

Generally, application include programs, routines, objects, widgets, plug-ins, and other similar structures that perform particular tasks or implement particular abstract data types. Those skilled in the art can implement the description and/or figures herein as computer-executable instructions, which can be embodied on any form of computing machine-readable media discussed herein.

Many functions performed by electronic hardware components can be duplicated by software emulation. Thus, a software program written to accomplish those same functions can emulate the functionality of the hardware components in input-output circuitry.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

The invention claimed is:

1. A conversational assistant for conversational engagement platform, comprising:
   a conversational engagement microservice platform containing various modules of a user-model augmentation module, a dialogue management module, and a user-state analysis input/output module, where the dialogue management module is configured to receive metrics tied to a user from the other modules to understand a current topic of a conversation and a user's emotions regarding the current topic of the conversation from the user-state analysis input/output module and then adapt dialogue from the dialogue management module to the user based on a first set of dialogue rules factoring in these different metrics, where the conversational engagement microservice platform containing the various modules is configured to at least use the user-state analysis input/output module to extract the metrics tied to the user through conversations with the user over multiple different periods of interaction, where the first set of dialogue rules of the conversational engagement microservice platform containing the various modules are also configured to factor both i) a duration of a conversational engagement with the user and ii) an attempt to maintain a positive experience for the user with the conversational engagement, where the dialogue management module cooperates with the user-model augmentation module to implement and maintain a flexible ontology relationship representation about the user that builds and stores learned metrics about the user over time with each conversational engagement and then in combination with the first set of dialogue rules, drive the conversations in the conversational engagement with the user, where the dialogue management module is configured to cooperate with an information-extraction and topic-understanding input/output module to receive i) the metrics tied to the user and ii) at least one of spoken words and a transcript of the conversational engagement with the user to deduce and understand the current topic of the conversation without requiring the user to provide advance notice of what the current topic of the conversation will be about,
   one or more non-transitory computer readable mediums to store software implemented in the conversational engagement microservice platform, and
   one or more processors configured to execute the stored software in the one or more non-transitory computer readable mediums.

2. The conversational assistant for conversational engagement platform of claim 1, wherein the user-model augmentation module is further configured to detect for and track, via storing in long-term memory, user-specific knowledge on two or more topics selected from a group consisting of: 1) family and other people associated with this user, 2) concerns this user has expressed, 3) emotional state associated with this user, 4) auditorily-detectable health indicators associated with this user, and 5) interests associated with this user, as well as
   wherein the user-model augmentation module is further configured to create and maintain one or more nodes for each of these topics in the flexible ontology relationship representation as well as link relationships between two or more topics tailored specific to the user.

3. The conversational assistant for conversational engagement platform of claim 2, where each node in the flexible ontology relationship representation associated with this user is associated with a particular topic and has a link to a storage location of learned facts and other information about the topic associated with that node, where one or more of the topic nodes and the stored learned facts are referenced by the dialogue management module to populate questions and/or responses in the dialogue when the dialogue management module dialogues with the user.

4. The conversational assistant for conversational engagement platform of claim 1, wherein the user-model augmentation module is further configured to use a second set of dialogue rules codified through a dialogue specification language to dynamically adapt between the conversational assistant for conversational engagement platform initiating i) a free-form casual conversation with the user and ii) a directed dialogue with the user on a specific topic, based on a current conversational context.

5. The conversational assistant for conversational engagement platform of claim 4, wherein the dialogue specification language is configured to enable expressive context-aware modeling of conversational content for end users in a textual language, where the second set of dialogue rules and branching structures is further codified to decide whether to continue on the current topic and when to transition off that topic but continue an engagement conversation with another topic is codified in the dialogue specification language, where the dialogue specification language is structured to enable a code size reduction from one or more previous dialogue workflow specifications; and thus, saves space on memory storage and power consumption to use this dialogue specification language.

6. The conversational assistant for conversational engagement platform of claim 1, wherein once a given topic is selected to be discussed, then the dialogue management module is configured to use the first set of dialogue rules to review i) an entire current conversation on that topic, ii) stored information on one or more previous conversations on that topic, and iii) stored information from linked topic nodes, as weighted factors to guide what a next question and/or response in the dialogue will be about; and then, utilize dialogue templates populated and derived from the above information to generate the dialogue.

7. The conversational assistant for conversational engagement platform of claim 1, wherein the user-state analysis input/output module is configured to cooperate with the dialogue management module and its specification of the first set of dialogue rules in order to use a user state analysis to adapt the topic of the conversation to 1) points in that topic the user is amenable to and/or 2) points in another topic that the user is positive to and steer the conversation away from points in topics that the user state indicates negativity currently toward.

8. The conversational assistant for conversational engagement platform of claim 1, further comprising:
   where the information-extraction and topic-understanding input/output module is configured to cooperate with the dialogue management module, where the information-extraction and topic-understanding input/output module is configured to detect and keep track of a topic ID, derived from hierarchical classifiers for topics and co-clustering of related topics, in order to correctly identify a set of topics that are discussed in a free-form conversation between the user and the conversational assistant for conversational engagement platform.

9. The conversational assistant for conversational engagement platform of claim 1, further comprising:
an audibly detectable health input/output module configured to cooperate with the dialogue management module, where the audibly detectable health input/output module is configured to i) monitor all dialogues with the user in order to monitor a current state of a user's health, and ii) reference data stored on a prior history of the user's health condition, including coughs, in a current or subsequent conversation session, when deciding when to change the current topic over to a topic on the user's health.

10. The conversational assistant for conversational engagement platform of claim 1, further comprising:
a text-to-speech input/output module that has at least one of i) one or more interfaces to state data for a speech-to-text process, and ii) links to the state data for the speech-to-text process, from a text-to-speech component, where the links and/or interfaces exchange information with i) an automatic speech recognition module to detect and comprehend a user's audio input as well as ii) the text-to-speech component to generate audio responses and queries from the conversational assistant for conversational engagement platform, where an entirety of a conversation of a current session is stored in a short term memory so that the various modules can analyze both i) a user's specific utterances in context to a current question and/or response and ii) the user's specific utterances in light of a context of the entirety of the conversation of the current session with the user 1) when deciding subsequent dialogues, 2) when deciding to change the current topic, and 3) when deciding how to continue the conversational engagement with the user.

11. A method for a conversational assistant for conversational engagement platform, comprising:
receiving metrics tied to a user in a dialogue management module of the conversational assistant for conversational engagement platform to understand a current topic of a conversation and a user's emotions regarding the current topic of the conversation and then adapting dialogue from the dialogue management module to the user based on a first set of dialogue rules factoring in these different metrics,
extracting the metrics tied to the user through conversations with the user over multiple different periods of interaction,
adapting the conversational engagement with the user with the first set of dialogue rules in order to factor both i) a duration of a conversational engagement with the user and ii) attempt to maintain a positive experience for the user with the conversational engagement,
maintaining a flexible ontology relationship representation about the user that that builds and stores learned information about the user over time with each conversational engagement and then in combination with the first set of dialogue rules drive the conversations with the user, and
receiving i) the metrics tied to the user and ii) at least one of spoken words and a transcript of the conversational engagement with the user to deduce and understand the current topic of the conversation without requiring the user to provide advance notice of what the current topic of the conversation will be about.

12. The method of claim 11, further comprising:
detecting for and tracking, via storing in long term memory, user-specific knowledge on two or more topics selected from a group consisting of 1) family and other people associated with this user, 2) concerns this user has expressed, 3) emotional state associated with this user, 4) auditorily-detectable health indicators associated with this user, and 5) interests associated with this user, as well as
creating and maintaining one or more nodes for each of these topics in the flexible ontology relationship representation as well as link relationships between two or more topics tailored specific to the user.

13. The method of claim 12, where each node in the flexible ontology relationship representation associated with this user is associated with a particular topic and has a link to a storage location of learned facts and other information about the topic associated with that node, where one or more of the topic nodes and the stored learned facts are referenced by the dialogue management module to populate questions and/or responses in the dialogue when the dialogue management module dialogues with the user.

14. The method of claim 11, further comprising:
using a second set of dialogue rules codified through a dialogue specification language to dynamically adapt between the conversational assistant for conversational engagement platform initiating i) a free-form casual conversation with the user and ii) a directed dialogue with the user on a specific topic, based on a current conversational context.

15. The method of claim 14, wherein the dialogue specification language enables expressive context-aware modeling of conversational content for end users in a textual language, where the second set of dialogue rules and branching structures is further codified to decide whether to continue on the current topic and when to transition off that topic but continue an engagement conversation with another topic are codified in the dialogue specification language.

16. The method of claim 11, wherein once a given topic is selected to be discussed, then the dialogue management module is configured to use the first set of dialogue rules to review i) an entire current conversation on that topic, ii) stored information on one or more previous conversations on that topic, and iii) stored information from linked topic nodes, as weighted factors to guide what a next question and/or response in the dialogue will be about; and then, utilize dialogue templates populated and derived from the above information to generate the dialogue.

17. The method of claim 11, wherein the first set of dialogue rules and branching structures use a user state analysis to adapt the topic of the conversation to 1) points in that topic the user is amenable to and/or 2) points in another topic that the user is positive to and steer the conversation away from points in topics that the user state indicates negativity currently toward.

18. The method of claim 11, further comprising:
detecting and keeping track of a topic ID, derived from hierarchical classifiers for topics and co-clustering of related topics, in order to correctly identify a set of topics that are discussed in a free-form conversation between the user and the conversational assistant for conversational engagement platform.

19. The method of claim 11, further comprising:
monitoring all dialogues with the user in order to monitor a current state of a user's health, and
referencing data stored on a prior history of the user's health condition through auditory assessment, including coughs, in a current or subsequent conversation session, when deciding when to change the current topic over to a topic on the user's health.

20. The method of claim 11, further comprising:
pushing or pulling state data for a speech-to-text process from a text-to-speech component,
exchanging information with an automatic speech recognition (ASR) module to detect and comprehend a user's audio input as well as
exchanging information with the text-to-speech component to generate audio responses and queries from the conversational assistant for conversational engagement platform, where an entirety of a conversation of a current session is stored in a short term memory so that various modules of the conversational assistant for conversational engagement platform can analyze both i) a user's specific utterances in context to a current question and/or response and ii) the user's specific utterances in light of a context of the entirety of the conversation of the current session with the user 1) when deciding subsequent dialogues, 2) when deciding to change the current topic, and 3) when deciding how to continue the conversational engagement with the user.

* * * * *